US008233784B2

(12) United States Patent
Zenteno et al.

(10) Patent No.: US 8,233,784 B2

(45) Date of Patent: Jul. 31, 2012

(54) RADIANT HEATER

(75) Inventors: Enoch A. Zenteno, Oak Park, IL (US); Fermin Adames, Sr., Inverness, IL (US)

(73) Assignee: Tempco Electric Heater Corporation, Wood Dale, IL (US)

( * ) Notice: Subject to any disclaimer, the term of this patent is extended or adjusted under 35 U.S.C. 154(b) by 756 days.

(21) Appl. No.: 12/304,845

(22) PCT Filed: Jun. 15, 2007

(86) PCT No.: PCT/US2007/071306

§ 371 (c)(1), (2), (4) Date: Dec. 15, 2008

(87) PCT Pub. No.: WO2007/147100

PCT Pub. Date: Dec. 21, 2007

(65) Prior Publication Data

US 2009/0279879 A1 Nov. 12, 2009

Related U.S. Application Data

(60) Provisional application No. 60/814,268, filed on Jun. 16, 2006.

(51) Int. Cl.
*A21B 2/00* (2006.01)

(52) U.S. Cl. ......................... 392/416; 392/407; 392/411

(58) Field of Classification Search ........... 392/407–415
See application file for complete search history.

(56) References Cited

U.S. PATENT DOCUMENTS

| | | | | | |
|---|---|---|---|---|---|
| 1,514,628 | A | * | 11/1924 | Pritzker | 219/455.12 |
| 1,686,865 | A | * | 10/1928 | Klotz | 392/423 |
| 2,879,369 | A | * | 3/1959 | Huseby | 392/430 |
| 3,141,089 | A | * | 7/1964 | Hultgreen | 392/423 |
| 3,179,789 | A | * | 4/1965 | Gialanella | 392/424 |
| 3,317,707 | A | * | 5/1967 | Knudson et al. | 392/353 |
| 3,363,090 | A | * | 1/1968 | Langley | 219/540 |
| 3,525,850 | A | * | 8/1970 | Hager, Jr. | 392/433 |
| 3,684,859 | A | * | 8/1972 | Desloge | 392/432 |
| 4,004,128 | A | * | 1/1977 | Marchesi | 392/407 |
| 4,331,878 | A | * | 5/1982 | Steinmetz | 250/504 R |
| 4,563,572 | A | * | 1/1986 | Hager, Jr. | 392/423 |
| 4,626,659 | A | * | 12/1986 | Charmes et al. | 392/408 |

(Continued)

FOREIGN PATENT DOCUMENTS

CN 88100211 8/1988

(Continued)

OTHER PUBLICATIONS

Notification of the First Office Action from the State Intellectual Property Office of the People's Republic of China, Chinese Patent Application No. 200780030258.4, dated Jun. 23, 2010.

(Continued)

*Primary Examiner* — Thor Campbell

(74) *Attorney, Agent, or Firm* — Michael Best & Friedrich LLP

(57) ABSTRACT

A radiant heater includes a heater body having a box-like configuration, the body defining an inner cavity and including a base wall and an open end opposite the base wall. The body is fabricated from a ceramic material. The body also includes a heating element extending a length of the body and positioned to direct energy through the open end of the body.

24 Claims, 19 Drawing Sheets

U.S. PATENT DOCUMENTS

| | | | | | |
|---|---|---|---|---|---|
| 4,703,154 | A | * | 10/1987 | Ikegami et al. | 392/435 |
| 4,835,367 | A | * | 5/1989 | Hoffman | 392/376 |
| 4,892,997 | A | * | 1/1990 | McWilliams | 219/448.11 |
| 5,049,725 | A | * | 9/1991 | Abramson | 392/412 |
| 5,296,686 | A | * | 3/1994 | Ullrich et al. | 219/553 |
| 5,561,735 | A | * | 10/1996 | Camm | 392/416 |
| 5,626,125 | A | * | 5/1997 | Eaves | 126/91 A |
| 5,711,089 | A | | 1/1998 | Pikus | |
| 5,761,377 | A | * | 6/1998 | Wolfe et al. | 392/376 |
| 6,154,606 | A | * | 11/2000 | Shaw et al. | 392/360 |
| 6,188,047 | B1 | * | 2/2001 | White et al. | 219/460.1 |
| 6,188,836 | B1 | * | 2/2001 | Glucksman et al. | 392/376 |
| 7,067,773 | B2 | * | 6/2006 | DeWitt | 219/451.1 |
| 7,254,319 | B2 | * | 8/2007 | Bonnin et al. | 392/423 |
| 2003/0077078 | A1 | | 4/2003 | Wu | |
| 2003/0095796 | A1 | | 5/2003 | Eckert et al. | |
| 2006/0051078 | A1 | | 3/2006 | Bonnin et al. | |

FOREIGN PATENT DOCUMENTS

| | | |
|---|---|---|
| DE | 3720103 | 3/1989 |
| DE | 19812188 | 9/1999 |
| DE | 10055743 | 5/2002 |
| FR | 1119194 | 6/1956 |
| WO | 2004080126 | 9/2004 |
| WO | 2006030370 | 3/2006 |

OTHER PUBLICATIONS

Notification of the Second Office Action from the State Intellectual Property Office of the People's Republic of China, Chinese Patent Application No. 200780030258.4, dated Mar. 15, 2011.

Extended European Search Report, European Patent Application No. 07812159.7, mailed Nov. 3, 2010.

PCT/US07/71306 International Search Report and Written Opinion of the International Searching Authority mailed Oct. 23, 2008, 8 pages.

Office Action from State Intellectual Property Office of People's Republic of China for Application No. 200780030258.4 dated Aug. 24, 2011 (4 pages).

Office Action from State Intellectual Property Office of People's Republic of China for Application No. 200780030258.4 dated Dec. 16, 2011 (6 pages).

* cited by examiner

RADIANT HEATER

CROSS-REFERENCE TO RELATED APPLICATIONS

This application claims priority from U.S. Provisional Patent Application No. 60/814,268, entitled "Radiant Heater," filed Jun. 16, 2006 by Enoch A. Zenteno and Fermin Adames Sr.

BACKGROUND

This invention relates to heating elements and, more particularly, to ceramic, infrared-radiant heaters.

Heat transfer may be accomplished through convection, conduction and radiation. As is known, convection is heat transfer by mass motion of a medium such as air or water when the heated medium is caused to move away from the source of heat, carrying energy with it; conduction is heat transfer by means of molecular agitation within a material without any motion of the material as a whole; and radiation is heat transfer by the emission of electromagnetic waves that carry energy away from the emitting object. Of the foregoing, radiation is the most efficient and flexible heat transfer means, and is adaptable to a variety of applications.

Industrial infrared heaters are generally classified by type (e.g., short, medium and long wavelength) based on the position of the maximum emission or peak wavelength in their spectral radiant power distribution. This categorization is based solely on the temperature of the heating element itself and by the application of Wien's displacement law. In other words, a short-wave heater is classified as such because its coil can reach steady state temperatures between 2148° F. (2 μm) and 6060° F. (0.8 μm); similarly, a medium-wave heater's coil temperatures is capable of reaching between 845° F. (4 μm) and 2148° F. (2 μm); and finally, a long-wave heater has coil temperatures less than 845° F. (or $\lambda_{max}$>4 μm).

Radiant heating elements are typically used in applications where directional or focused heating is required. To this end, as is known, quartz heaters include elongated tubes and metal reflectors, and ceramic heaters are formed as curved or flat panels. Some processes used to manufacture heaters limit the shapes that the heaters may assume. Processes have been developed to produce heaters having non-standard shapes, but such processes have limitations on the internal construction of such heaters. These limitations on internal construction do not provide a heater having the highest potential efficiency. Yet other processes only allow for the production of a single type of heater (i.e., the process is capable of only producing a heater that radiates in a 180° range or a heater that radiates in a 360° range, not both).

Infrared radiation is absorbed by organic molecules and converted into molecular vibration energy. When the radiant energy matches the energy of a specific molecular vibration, absorption occurs. In one embodiment, an efficient infrared heating system comprises a set of infrared heaters with the emissive wavelengths finely tuned to match the absorption wave-lengths for a given application at its various stages of the heating process. That is, as the drying process progresses and the absorption wavelength of the material changes, the emissive wavelength changes accordingly, as shown in FIG. 1.

Referring to FIG. 1, Zone A of the system, near the entrance of the conveyor system, or process path, may contain short-wave heaters operating at near 2 μm to match the first peak of the absorption spectra for water (around 95%). In the middle of the heating application (i.e., Zone B), medium-wave heaters may be employed to match the second highest absorption peak (around 94%). Finally in Zone C, close to the end of the conveyor, just before exiting the system, and to prevent a strong thermal shock for the application material, long-wave heaters may be placed to match the final high absorption peak (around 78%).

In a real-world application, however, the construction and operation of such a system is very difficult to achieve because there is no infrared heater in the industry that can deliver short, medium or long waves as a single unit. Each heater type has unique design, construction and operation requirements that make them very difficult to combine with other types. For instance, the heat output of a short-wave emitter is so high that often cooling systems are required to maintain the heater's housing at permissible levels.

Currently used industrial radiant heaters have two elements in common, a reflective surface and a housing. Heaters provided by Elstein-Werk M. Steinmetz GmbH & CO. KG (Germany) and Heraeus Noblelight Inc. (Duluth, Ga.) both include a gold reflective material directly applied to the housing and to the quartz material, respectively. The direct application of the gold makes the overall size of the heater smaller and easier to handle because there is no need for a reflector (i.e., the body itself is a reflector). However, the power generated by the heated element cannot exceed a certain limit that would cause the gold to evaporate (greater than 820° C.). Further, there still is a considerable amount of heat that the reflector will absorb and conduct to the back-side of the heater, thereby heating up the structure that holds the heater and not the application. Heaters by Fostoria Industries (Fostoria, Ohio) and the Research Inc. (Eden Prairie, Minn.) require a reflector embedded in a steel housing for the heater to operate properly.

Another example of an industrial radiant heater includes a ceramic infrared heater that is either solid or hollow. High powered hollow heaters exhibit a tendency to develop cracks at the outer shell as a result of thermal expansion mismatch between an embedded coil layer and an outer shell. In simple heat transfer terms, the Joule heating generated at the coil is transferred to the surrounding ceramic layer by conduction. Because of the low thermal conductivity of ceramics, the coil layer is impacted significantly faster than the outer shell resulting in a large temperature gradient between both layers, causing at the same time, a large thermal expansion mismatch. In some cases, the tensile strains exceed the strength of the body and visible cracks develop to release the strain. These cracks form in either glazed or unglazed ceramic bodies, and those with or without heads. Such cracking suggests that the cracks were not induced by residual stresses caused by the cooling glaze, but rather by the larger expansion suffered by the coil layer during energization.

The challenge of designing an infrared heater that would emit in all available wavelengths requires consideration of the parameters of existing infrared units. Existing ceramic body heaters with embedded ferritic alloys (FeCrAl) have a high mechanical stability, but have maximum power limitations resulting in microstructure fractures that induce dielectric failure in high wattage/voltage units. Infrared heaters with quartz tubes enclosed in sheet frame have a resistance coil that freely expands within the tubes; however, the sheet metal structure is highly susceptible to corrosion, distortion and deformation. Finally, tungsten-halogen and carbon infrared lamps have a fast response time and provide control and management of the emitter wavelengths, but such lamps have limited assembly options.

SUMMARY

In one embodiment, the invention provides a radiant heater including a heater body having a box-like configuration, the body defining an inner cavity and including a base wall and an open end opposite the base wall. The body is fabricated from a ceramic material. The radiant heater also includes a heating element extending a length of the body and positioned to direct energy from through the open end of the body.

In another embodiment, the radiant heater includes a heater body having a box-like configuration, the body defining an inner cavity and including a base wall and an open end opposite the base wall. The body is fabricated from a ceramic material. A heating element extends a length of the body and is positioned to direct energy from through the open end of the body. The radiant heater also includes a reflector positioned between the base wall of the body and the heating element, wherein a reflective surface of the reflector re-directs energy from the heating element through the open end of the body.

In yet another embodiment, the invention provides an industrial heating system for use in drying or heating processes. The heating system includes a housing for positioning adjacent a process path for a process material and a radiant heater housed within the housing and directed towards the process path. The radiant heater includes a heater body having a box-like configuration, the body defining an inner cavity and including a base wall and an open end opposite the base wall, the open end directed towards the process path. The heater body is formed from a ceramic material. A heating element extends a length of the body and is positioned to direct energy through the open end of the body. The radiant heater also includes a reflector positioned between the base wall of the body and the heating element, wherein a reflective surface of the reflector re-directs energy from the heating element through the open end of the body.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
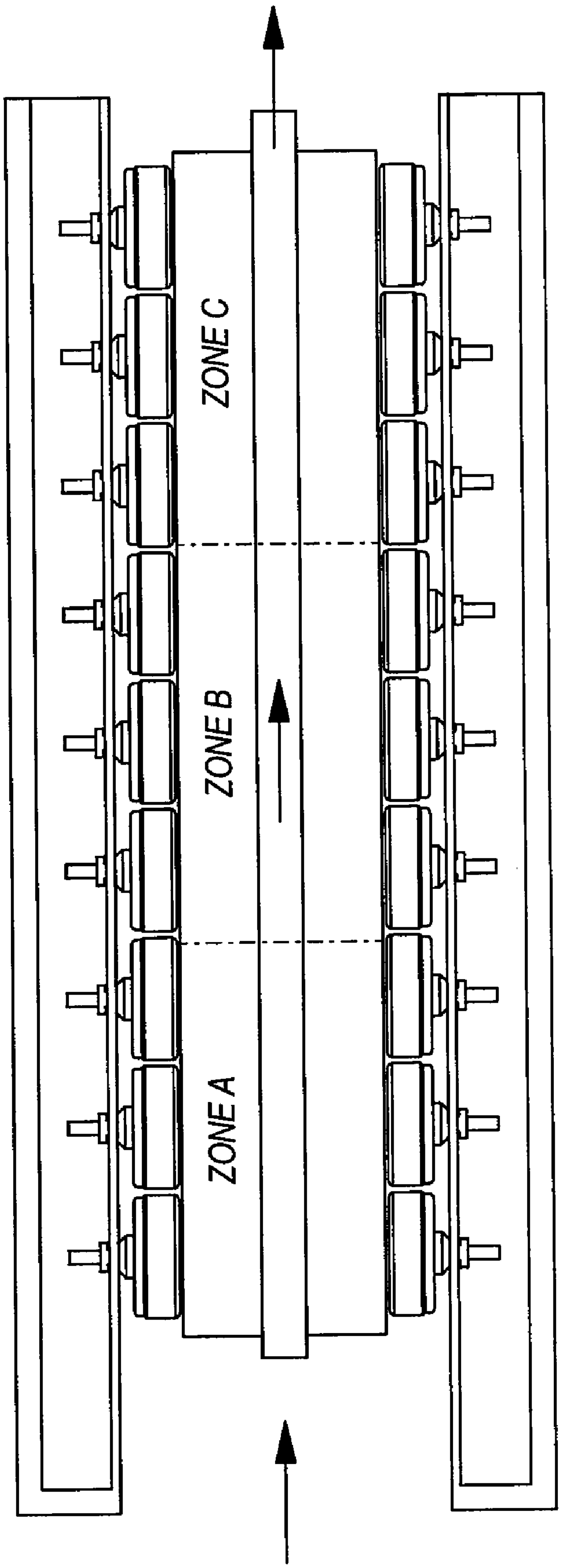
FIG. 1 illustrates an example of an infrared heating system for a drying process.

Infrared heaters are used in a variety of industrial and medical applications for providing radiant heat in a drying or heating process. Examples of industrial applications include textile processing, food processing, thermoforming, film processing, liquid processing, or the like. It is also possible to use the infrared heaters as a radiant heat source, such as with outdoor heating. Radiant heaters are generally housed in a structural housing (e.g., FIG. 1), as is known in the art, and are directed towards process material, often transported along a process path. Examples of structural housings include a housing that accommodates a single heater, an array housing that accommodates a plurality of heaters along its length, a panel array housing that accommodates a plurality of heaters in an array configuration, or the like. Structural housings may be customized based upon a user's specifications. For example, the heaters may be utilized individually, or may be incorporated into a large assembly containing any combination of the heaters described below.

A preferred embodiment of the present invention radiant heater incorporates existing infrared technologies into a single unit. The radiant heater is capable of accommodating halogen-tungsten lamps (short-wave), carbon lamps (medium-wave, fast response), resistance wire embedded in twin and single quartz tubes (medium-wave and long-wave), as well as re-directing heat towards a given application (i.e., provide directional heat). The radiant heater can withstand thermal shock and provide high mechanical stability at any operating temperature. Finally, the radiant heater is compatible with industry-wide standard-size infrared heaters.

Figure 2A:
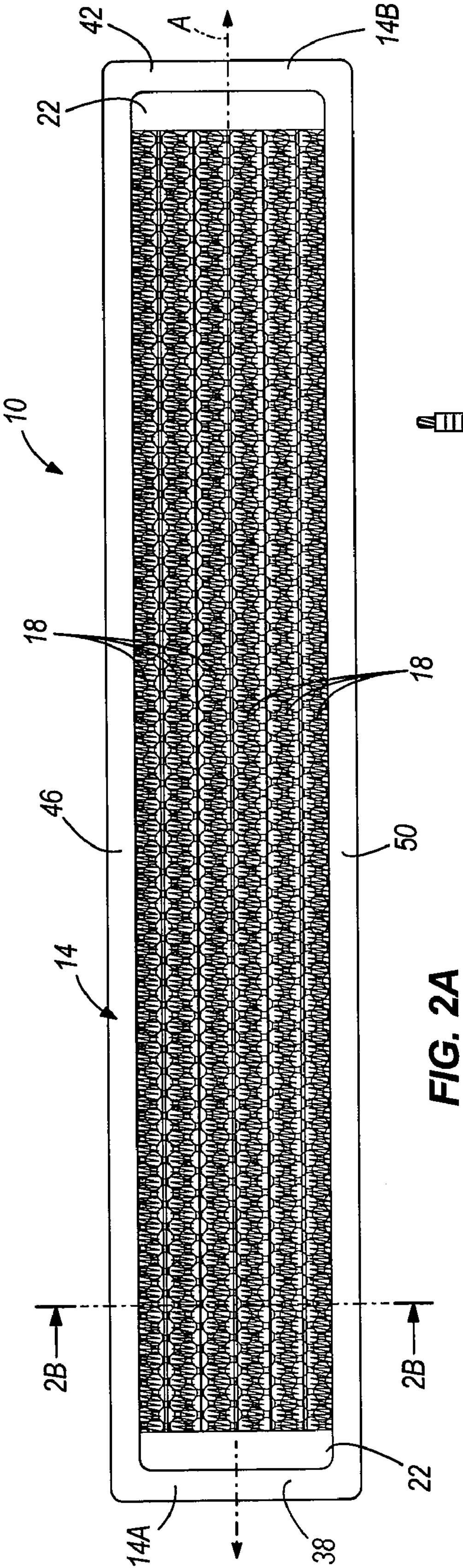
FIGS. 2A and 2B illustrate a radiant heater according to one embodiment of the invention.
Figure 2B:
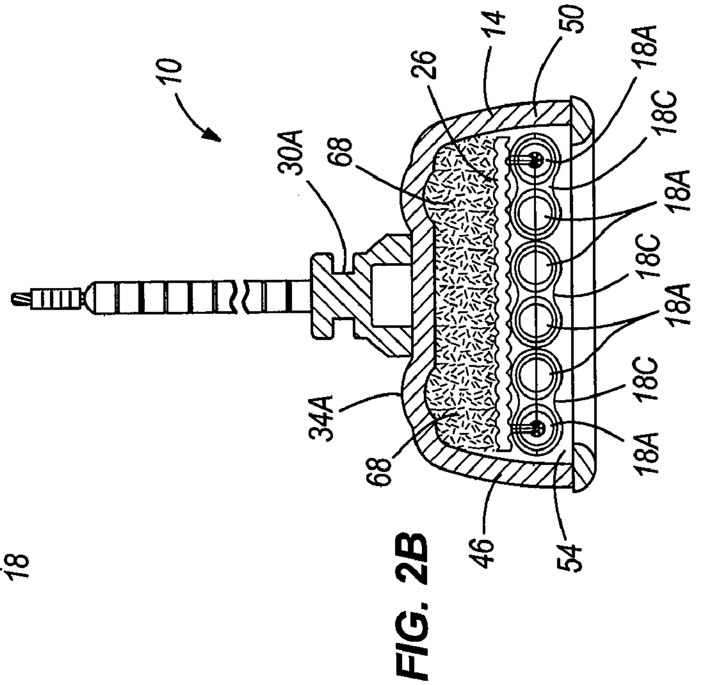
Figure 3A:
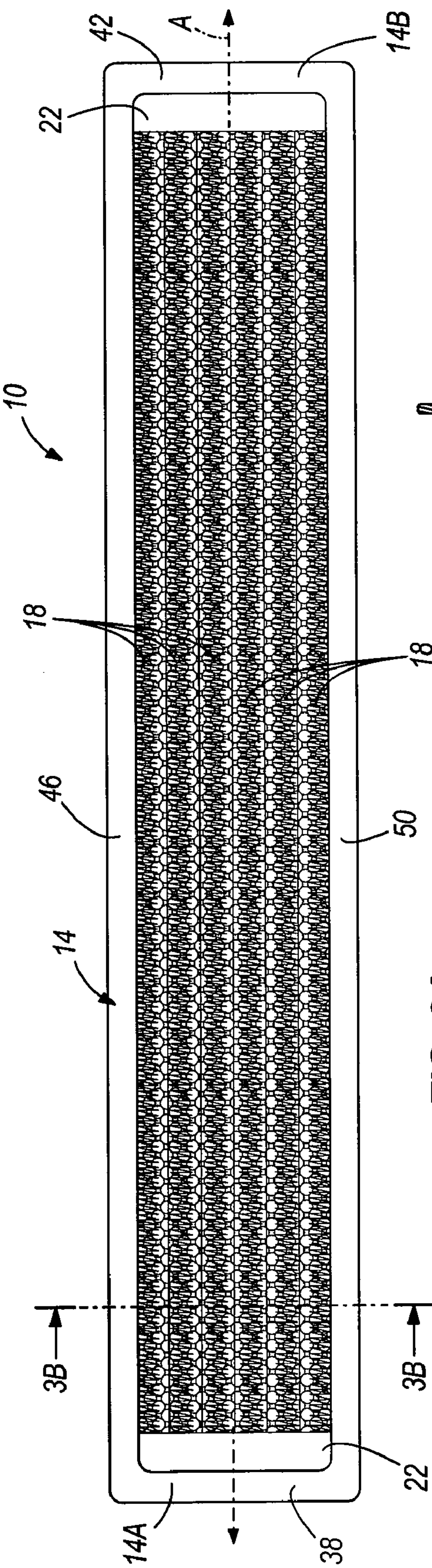
FIGS. 3A-3C illustrate a radiant heater according to another embodiment of the invention.

FIGS. 2A, 2B, 3A, 3B and 3C illustrate a radiant heater 10 according to one embodiment of the invention. The radiant heater 10 includes an elongated, generally-rectangular shaped body 14 (FIGS. 4A-4D) made of a ceramic material having a first end 14A and a second end 14B. A lengthwise axis A (FIGS. 2A, 3A and 4A) extends through a center of the body 14 and the first and second ends 14A, 14B. The heater 10 also includes six heating elements 18 (including a resistance wire element 18A housed within a quartz tube 18B), or lamps, extending the length of the body 14 between the first and second ends 14A, 14B, support plates 22 for holding the heating elements 18 in position within the body 14, a reflector 26 positioned between the heating elements 18 and the body 14, and mounting heads 30 for coupling the heater 10 to a housing (not shown).

Referring to FIGS. 4A-4D, the body 14 includes a base wall 34, a first end wall 38 at the first end 14A, a second end wall 42 at the second end 14B, and first and second side walls 46, 50 extending between the first and second end walls 38, 42. The walls 34-50 define an inner cavity 54 of the body 14, which contains the heating elements 18 and the support plates 22 of the heater 10. In the illustrated embodiment, the base wall 34 of the body 14 includes two arc-shaped areas 56, or concave areas, for increasing the size of the inner cavity 54.

The base wall 34 includes slots 58 for receiving the mounting heads 30. In the illustrated embodiment, the mounting heads 30 are oriented along the longitudinal axis A of the body 14 (FIGS. 2B and 3B), although in a further embodiment the mounting heads 30 may be oriented perpendicularly to the longitudinal axis A.

In the illustrated embodiment, the heater body 14 is fabricated from an ultra-low thermal expansion ceramic material that prevents crack formation in the body 14 when high temperature heating elements 18 are used. Currently used ceramic heaters form cracks and microcracks as a result of a thermal expansion mismatch between a heating element and an outer shell. Some heating elements can reach steady state temperatures up to 6100° F. or are rapidly energizing, which may result in thermal shock to the body, and thereby cracks.

Thermal shock failure of ceramic bodies occurs when large temperature gradients develop across wear sections; that is, one side of the body expands more rapidly than an adjacent side until the tensile strength produced on the opposite side exceeds the strength of the ceramic body. In the illustrated embodiment, the heater body 14 is formed from an ultra-low thermal expansion ceramic material, which causes little to no thermal expansion of the body either linearly or laterally. A ceramic body offers a high degree of mechanical and thermal stability and capacity, which is critical for fast cooling operations. When rapidly energizing heating elements or high temperature heating elements are used, cracking of the body 14 is prevented, and structural integrity of the ceramic body 14 is preserved even at very fast thermal loads. Further, the ceramic material of the body 14 keeps heat loss through the body 14 relatively low. In the illustrated embodiment, the ceramic material used for fabricating the body 14 includes the formulation set forth in the table below.

| Components | Percentage (by weight) | Description |
|---|---|---|
| Petalite | 65% | Lithium-Aluminum silicate |
| China Clay | 17.5% | Treviscoe china clay |
| Ball Clay | 17.5% | Hymod ball clay |
| Darvan ® No. 7 | 0.40% | Sodium Polymethacrylate and water |
| Water | 40% | |

Petalite, china clay, and ball clay may be supplied by Hammill & Gillespie (Livingston, N.J.), and Darvan® No. 7 may be supplied by R. T. Vanderbilt Company, Inc. (Norwalk, Conn.).

It should be readily apparent to those of skill in the art that low and ultra-low expansion ceramic material having other chemical formulations may be used to fabricate the body 14. Examples of other materials that may be used to for the body includes albite, cordierite, kyanite, lepidolite, mullite, spodumene, talc, or fused silica. For example, in one embodiment the ceramic material includes an acrylic material to increase the density and reduce porosity of the heater body 14. In this embodiment, the ceramic material used for fabricating the body 14 includes the formulation set forth in the table below.

| Components | Percentage (by weight) | Description |
|---|---|---|
| Petalite | 39.78% | Lithium-Aluminum silicate |
| China Clay | 10.71% | Treviscoe china clay |
| Ball Clay | 10.71% | Hymod ball clay |
| Darvan ® No. 7 | 0.40% | Sodium Polymethacrylate and water |
| Water | 24.48% | De-ionized water |
| Onglaze color | 7.96% | Series 94 lead-free onglaze color |
| Duramax B-1022 | 4.89% | Styrene/acrylic copolymer |
| Rhoplex HA-8 | 1.07% | Acrylic polymer |

Onglaze color may be supplied by Reusche & Co. of T.W.S., Inc. (Greeley, Colo.), and Duramax® B-1022 and Rhoplex® HA-8 may be supplied by Rohm and Haas Company (Philadelphia, Pa.).

Universal sizes for medium-wave and long-wave ceramic infrared heaters (i.e., the heater body) are about 60 mm by about 122 mm and about 60 mm by about 245 mm. In both embodiments, the body has a depth of about 18 mm and a thickness of about 3 mm. In another embodiment, the heaters may be manufactured in any combination of both sizes, such as about 60 mm by about 367 mm (245 mm plus 122 mm). It should be readily apparent to those of skill in the art that the body sizes may vary for custom designed radiant heaters. For example, the body may be wider, deeper, or longer to accommodate more heating elements, custom-sized heating elements, or electrical circuitry. Further, the body may be thicker or thinner depending on characteristics of the design, heating elements and ceramic used for the body.

Figure 4A:
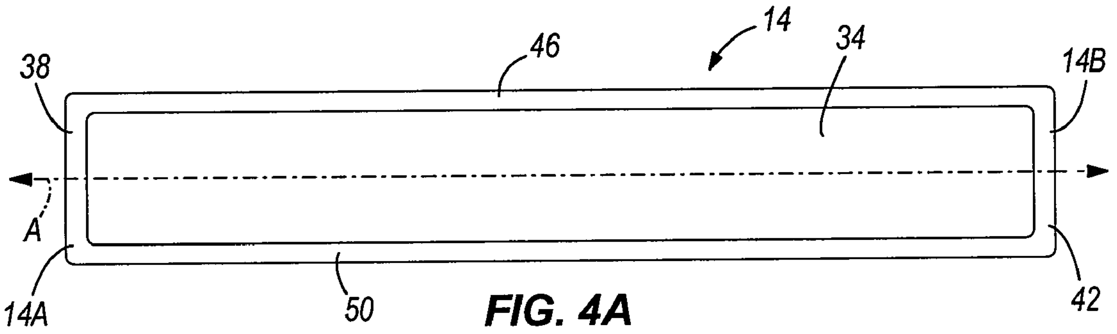
FIGS. 4A-4D illustrate a housing of the radiant heater according to one embodiment of the invention.
Figure 4B:
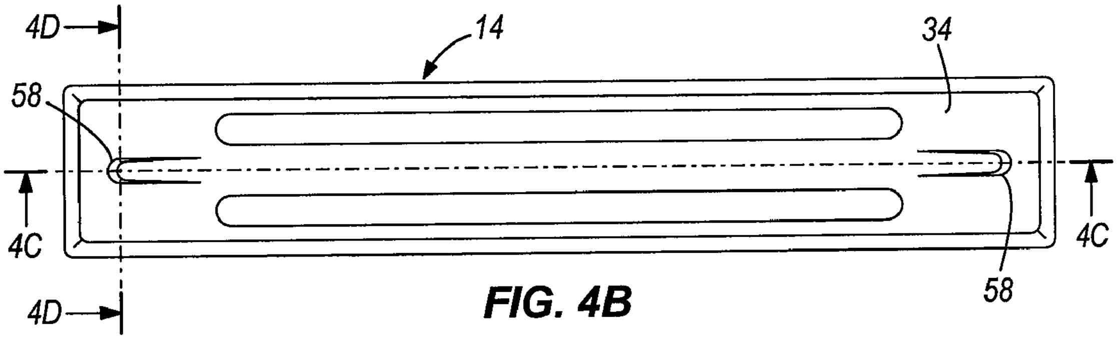
Figure 4C:
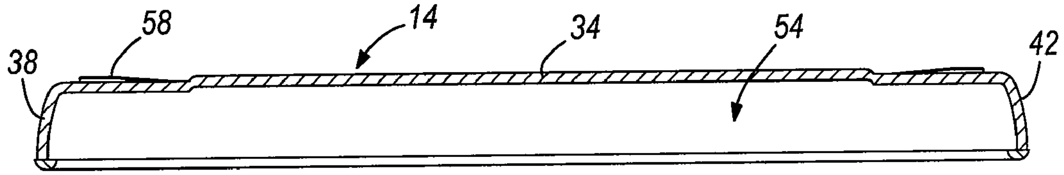
Figure 4D:
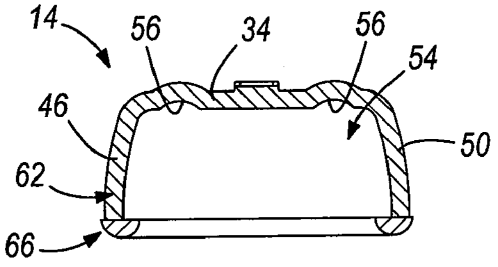

In one embodiment, the body 14 is fabricated from two molded pieces defined by a box portion 62 and an upper edge portion 66, or lip, of the body 14 (FIG. 4D). The two pieces 62, 66 are coupled together to form a single piece such that the body 14 has a homogenous structure. To fabricate the body 14, a first mold is used to form the box portion 62 from the ceramic material and a second mold is used to form the upper edge portion 66 from the ceramic material. A ceramic cement or glue is applied to an exposed edge of either the box portion 62 or the upper edge portion 66. One example of the cement includes about 45% mullite-based glue. The second mold is then placed on the first mold such that the box portion 62 and the upper edge portion 66 meet. After a setting period passes, the second mold is removed and the upper edge portion 66 is connected to the box portion 62. It should be readily apparent to those of skill in the art that other processes for fabricating the body 14 may be used.

Figure 3B:
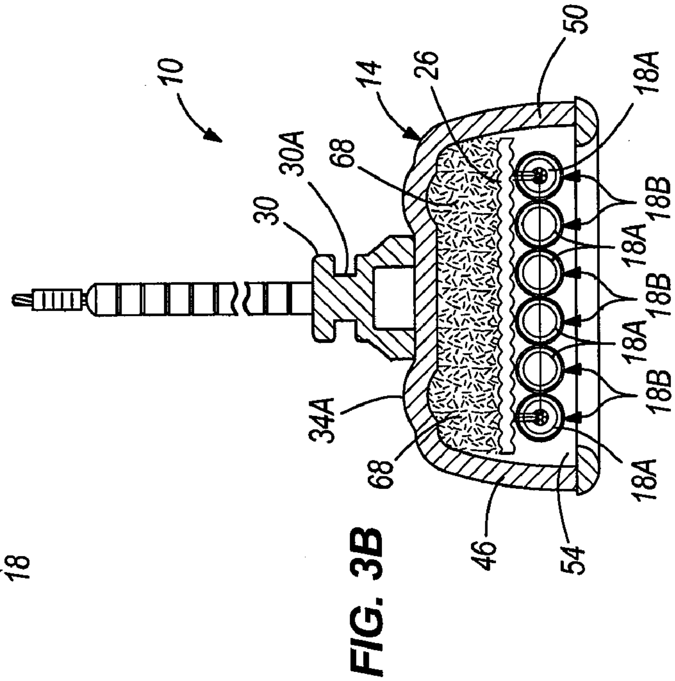

Referring to FIGS. 2B and 3B, the inner cavity 54 of the body 14 is filled with a ceramic fiber 68. The ceramic fiber 68 is positioned between the reflector 26 and the base wall 34 of the body 14 to provide additional insulation for the heater 10. It should be readily apparent to those of skill in the art that in further embodiments the inner cavity 54 may be devoid of ceramic fiber or filled with another insulating material.

Figure 3C:
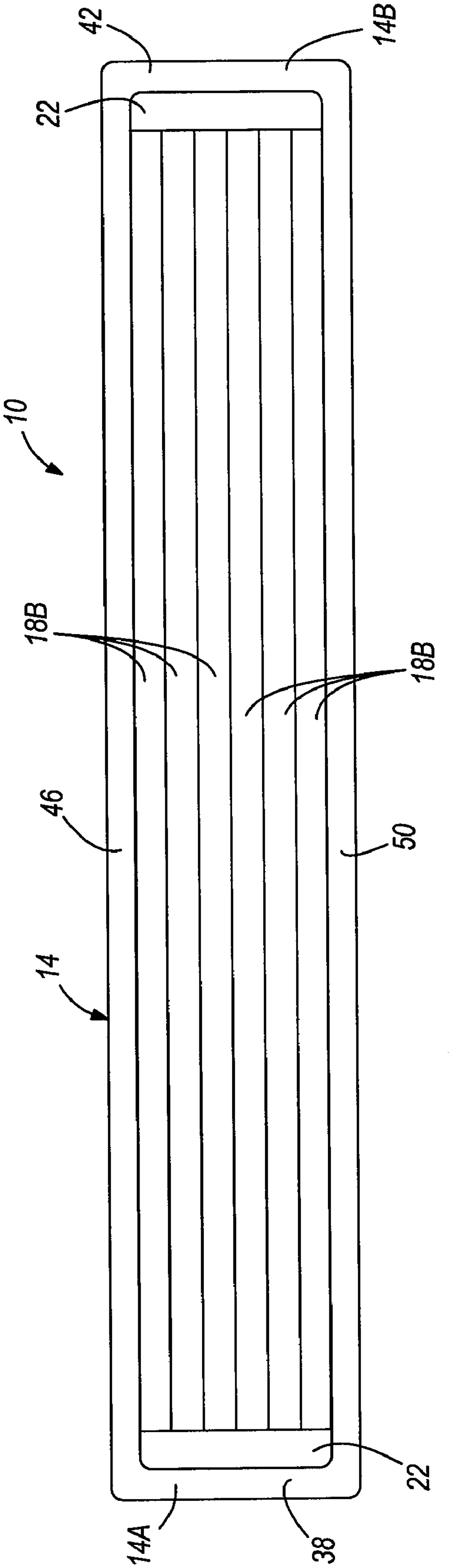

Referring to FIGS. 3A-3C, the heater 10 includes six heating elements 18 extending the length of the body 14 between the first and second ends 14A, 14B. Each heating element 18 includes a resistance wire element 18A housed within a clear or translucent quartz tube 18B. FIG. 3C illustrates the heater 10 without the wire elements or the reflector 26 to more clearly show the tubes 18B. Referring to the embodiment shown in FIGS. 2A-2B, the radiant heater 10 includes six resistance wire elements 18A housed in three twin bore quartz tubes 18C.

Each wire element is housed within one bore of the tube(s). The size of the heater body 14 may be modified to accommodate the twin bore tubes. The resistance wire element provides medium-wave to long-wave infrared heating and has a variable watt density from about 10 W/in$^2$ to about 75 W/in$^2$ (12 W/cm$^2$). The wire element has an energization or heat-up time of less than one minute. In one embodiment, the wire element is formed from a ferritic alloy (FeCrAl); however, in a further embodiment, the wire element may be formed from nickel chromium or a nickel chromium alloy.

Referring to FIGS. 2A, 3A and 3C, the support plates 22 hold and maintain the heating elements 18 within the inner cavity 54 of the body 14. A support plate 22 is positioned at each end of the body 14 and is coupled to the body 14 such that a portion of the support plate 22 overlaps the respective end of the heating element 18. In the illustrated embodiment, each support plate 22 has a generally rectangular shape and is sized to fit across the width of the body 14. The support plate 22 is generally used in heaters of the present invention including more than one heating element. In a further embodiment, the support plate 22 may include recesses or apertures for receiving the heating elements 18.

The support plate 22 is also fabricated from a hard, insulating ceramic material, which has low thermal expansion. In the illustrated embodiment, the ceramic material is steatite. It should be readily apparent to those of skill in the art that low or ultra-low expansion ceramic material having other chemical formulations may be used to fabricate the support plate 22.

The support plates 22 are coupled to the body 14 by a high temperature cement, or glue, that is capable of withstanding high temperatures. A high temperature cement is necessary to prevent the support plates 22 from separating from the body 14 at high operating temperatures of the heating elements 18. In the illustrated embodiment, the cement used for bonding the support plates 22 to the body 14 includes the formulation set forth in the table below.

| Components | Percentage (total weight) | Description |
|---|---|---|
| Ceramabind 642 | 65% | Inorganic, water-based binder system |
| Glaze frit | 17.5% | Bismuth borosilicate and cerium oxide frit (e.g., no. 94T1001) |

Ceramabind 642 may be supplied by Aremco Products, Inc. (Valley Cottage, N.Y.), and glaze frit may be supplied by Reusche & Co. of T.W.S. Inc. (Greeley, Colo.). It should be readily apparent to those of skill in the art that high temperature cement having other chemical formulations may be used to bond the support plates 22 to the body 14.

Figure 7A:
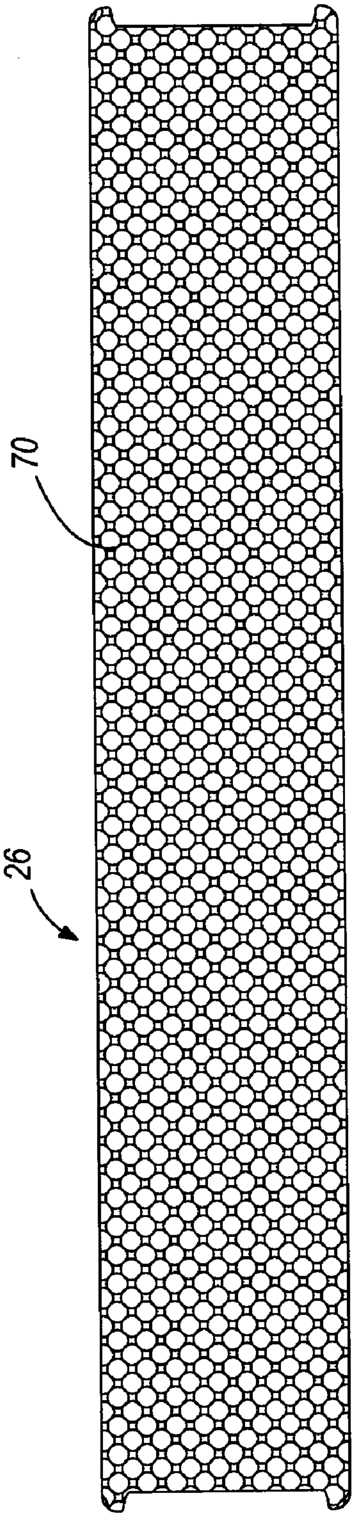
FIGS. 7A-7B illustrate one embodiment of a flat reflector for use with the radiant heater.
Figure 7B:
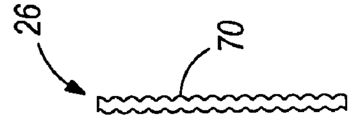

Referring to FIGS. 2A-2B and 3A-3C, the reflector 26 is positioned in the heater 10 between the heating elements 18 and the base wall 34 of the body 14. FIGS. 7A-7B illustrate one embodiment of the reflector 26 used in the radiant heater 10, which in the illustrated embodiment is generally planar or flat. The reflector 26 re-directs heat from the heating elements 18 out of the body 14 and to a process material (not shown). By reflecting heat back to the process material, heat loss of the heater 10 is kept relatively low because less heat is conducted to the base wall 34 and absorbed by the ceramic body 14. With respect to the flat reflector 26, the fraction of the electromagnetic radiation energy reflected from a reflective surface 70 relative to the energy incident upon the surface 70 depends on the radiant energy wavelength and the nature of the surface 70 and angle of incidence. Reflectivity is expressed by Kirchhoff's law as 1-e, where e is the emissivity of the surface 70. It should be appreciated that the body 14 and the reflector 26 reduce heat loss from the heater 10, either individually or in combination.

The reflector 26 has an elongated, generally rectangular-shaped body that is sized to fit within the inner cavity 54 of the heater body 14. In the illustrated embodiment, the reflector 26 is held in place between the support plates 22, which allows the reflector 26 to float and expand within the body 14. At least the reflective surface 70 of the reflector 26 includes a dome-like pattern or other recessed patterns or bumps to provide a more specular reflection of the radiant energy. In one embodiment, the bumps provide a greater reflection rate for the reflector 26.

In one embodiment, the reflector 26 includes a white reflective surface, which reflects about 75% of the radiant energy back to the process material. In further embodiments, the reflector 26 includes a gold reflective surface or a white gold reflective surface, which reflect about 95% of the radiant energy back to the process material.

The reflector 26 is formed from a ceramic compound base material, such as alumina powder. To fabricate the reflector 26, a length of alumina powder tape is cut and then embossed with a desired pattern. In another embodiment, the pattern is applied to the tape by stamping or scoring. It should be readily apparent to those of skill in the art that the reflector 26 may be fabricated without the pattern, or that any known reflective pattern may be used for the reflector.

Next, the tape is fired or baked (e.g., at 1200° C.) such that the reflector 26 hardens. In the illustrated embodiment, the tape is fired over a flat mold to achieve the planar surface. In another embodiment, the reflector 26 includes a parabolic shape and the tape is fired on a parabolic mold to achieve the parabolic shape.

Once the reflector 26 is shaped, a glaze is added to all surfaces of the reflector 26 and the reflector 26 is fired or baked (e.g., 1120° C.) again to bind the glaze to the reflector body. In the illustrated embodiment, the glaze acts as the reflective surface 70; however, in a further embodiment, the glaze provides a binder for applying the gold, white gold, or other reflective material. Due to the high amount of heat generated by the heating elements 18, the glaze keeps the reflective material bound to the reflector body at high temperatures. In the illustrated embodiment, the glaze used for the reflector 26 includes the formulation set forth in the table below.

| Components | Percentage (by weight) | Description |
|---|---|---|
| Clear Glaze | 35.6% | Glaze frit (e.g., ENQ9144E/P1) |
| Cristobalite | 1.2% | Silica powder 325 mesh |
| VeeGum ® | 1.5% | Suspending agent |

Clear glaze may be supplied by Johnson Matthey (Downington, Pa.), cristobalite may be supplied by CED Process Minerals (Tallmage, Ohio), and VeeGum® suspending agent may be supplied by R. T. Vanderbilt Company, Inc. (Norwalk, Conn.). It should be readily apparent to those of skill in the art that glaze having other chemical formulations may be used for the reflector 26.

If an additional reflective material is to be applied to the reflector 26, the material is added after the glaze is fired onto the reflector body. In one embodiment, the reflective material is sprayed onto the reflector 26 using an industrial spray system, as is known in the art. A gold reflective material is comprised of 24 caret gold and a white gold reflective material is comprised of about 90% 24 caret gold and about 10% platinum. In one embodiment, about 0.825 grams of reflective material are required to coat the reflective surface of the reflector 26. After the reflective material is applied to the reflector 26, the reflector 26 is fired or baked (e.g., 850° C.) again to bind all the materials together.

Referring to FIGS. 2B and 3B, the heater 10 includes the mounting heads 30 for coupling the heater 10 to a housing (not shown). The mounting heads 30 are coupled to an exterior surface 34A of the base wall 34 of the body 14. The mounting heads 30 are formed from a ceramic material, such as non-porous lava ceramic. A high temperature cement is necessary to prevent the mounting heads 30 from separating from the body 14 at high operating temperatures of the heating elements 18. In the illustrated embodiment, the cement used for bonding the mounting heads 30 to the body 14 includes the formulation set forth in the table below.

| Components | Percentage (by weight) | Description |
|---|---|---|
| Ceramabind 642 | 65% | Inorganic, water-based binder system |
| Black Glaze | 35% | Glaze frit (e.g., ENQ10615E/P1) |

Ceramabind 642 may be supplied by Aremco Products, Inc. (Valley Cottage, N.Y.), and black glaze may be supplied by Johnson Matthey (Downington, Pa.). It should be readily apparent to those of skill in the art that high temperature cement having other chemical formulations may be used to bond the mounting heads 30 to the body 14.

Figure 8:
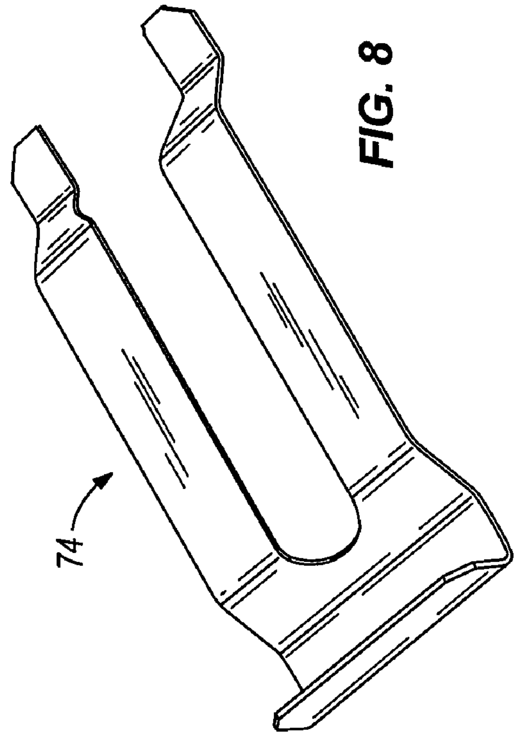
FIG. 8 illustrates one embodiment of a spring clip for use with a mounting head of the radiant heater.

To couple the heater 10 to a housing, the mounting head 30 is received by the slot 58 in the housing and a mounting spring clip 74 is coupled to a free end 30A of the head 30 to hold the heater 10 in position, as is known in the art. One example of the spring clip 74 is shown in FIG. 8.

Figure 5:
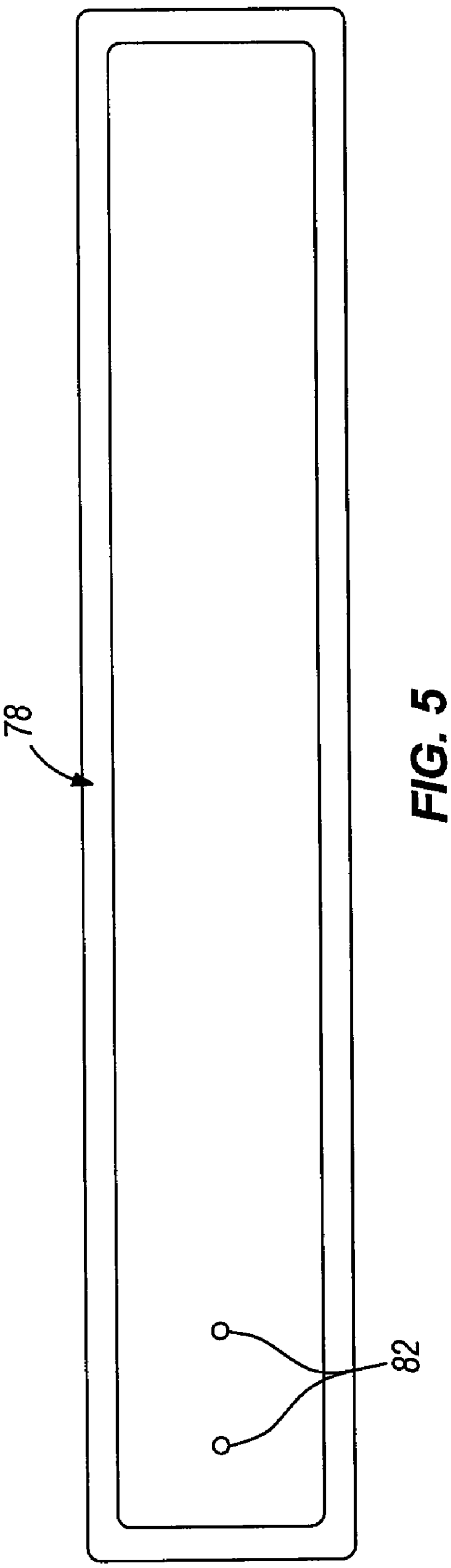
FIG. 5 illustrates a housing of the radiant heater according to one embodiment of the invention.
Figure 6:
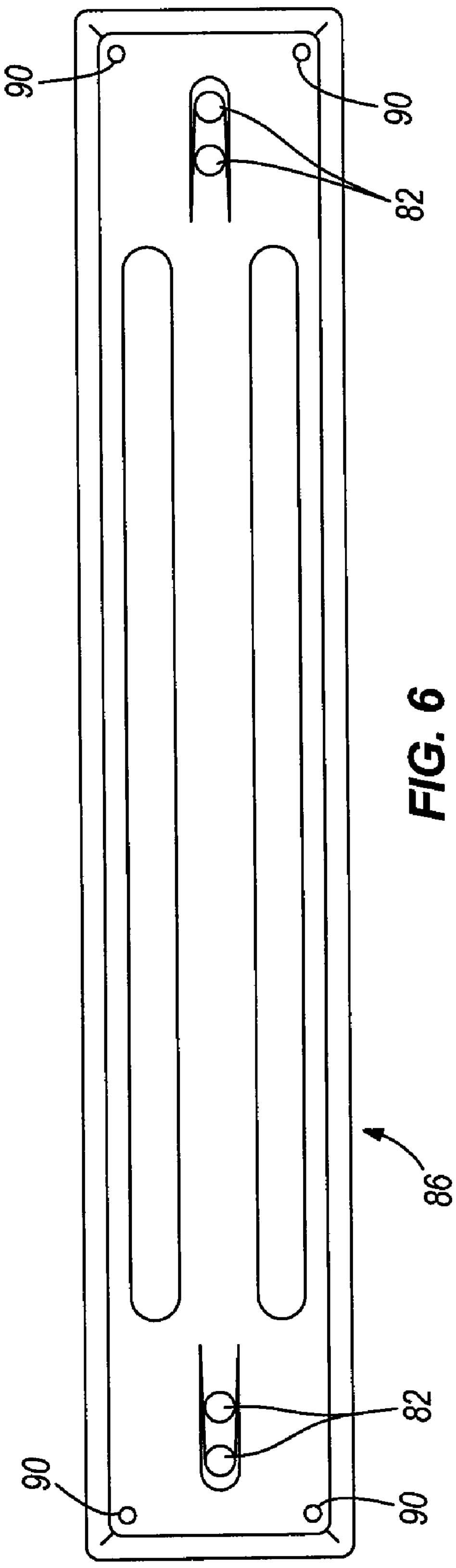
FIG. 6 illustrates a housing of the radiant heater according to another embodiment of the invention.
Figure 9:
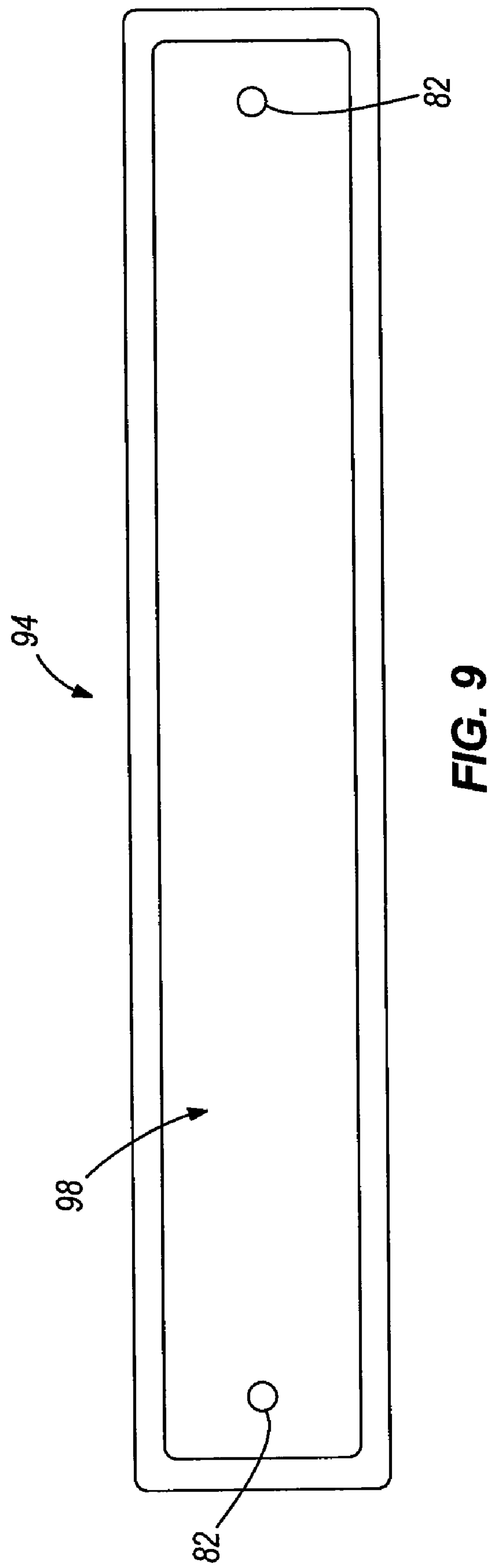
FIG. 9 illustrates one embodiment of a housing of the radiant heater shown in FIGS. 2A-2C.

FIGS. 5, 6 and 9 illustrate other embodiments of a body for the radiant heater 10 shown in FIGS. 2A-2B and 3A-3C. FIG. 5 illustrates a body 78 for the radiant heater 10 including apertures 82 for coupling an element holder, as discussed below. FIG. 6 illustrates a body 86 for the radiant heater 10 including the apertures 82 for the element holder, and convection holes 90 for dispersing heat or energy from the heater 10, as discussed below. FIG. 9 illustrates a body 94 of the radiant heater 10 including a modified inner cavity 98 for receiving the twin bore heating tubes with wire elements shown in FIGS. 2A-2B.

Figure 10A:
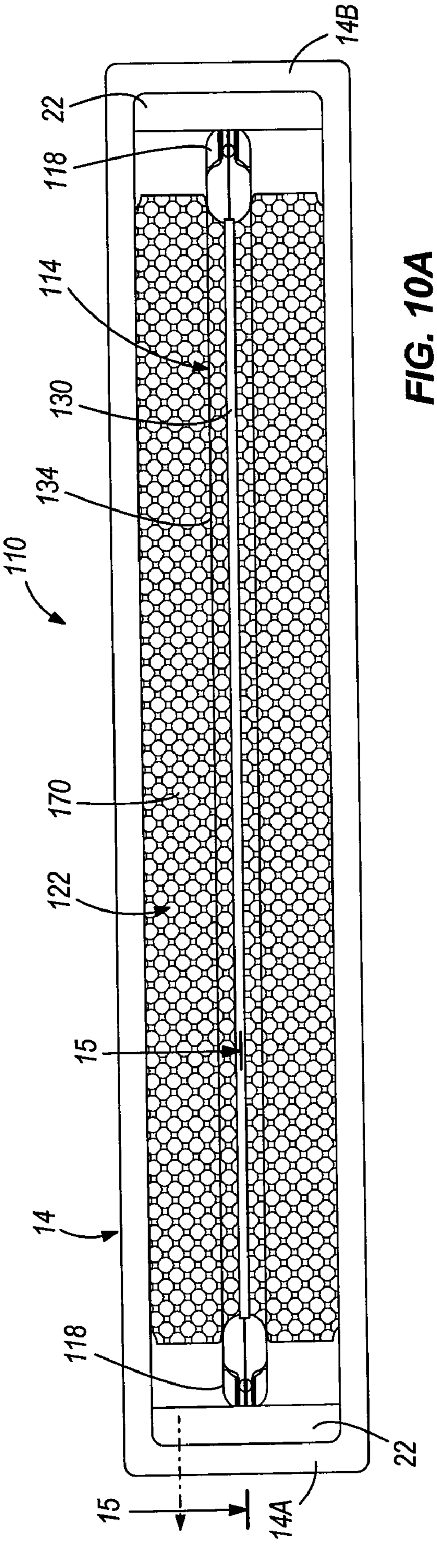
FIGS. 10A and 10B illustrate an embodiment of a radiant heater including halogen-tungsten lamps.
Figure 10B:
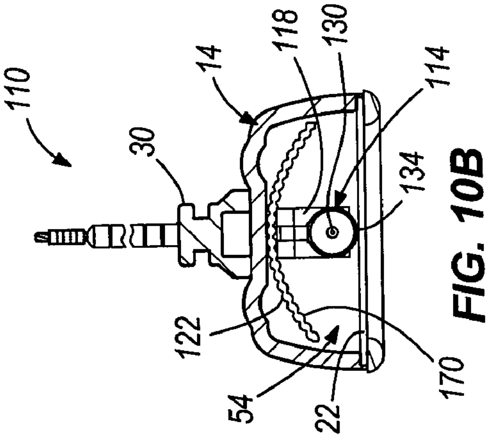

FIGS. 10A and 10B illustrate a radiant heater 110 according to another embodiment of the invention. The radiant heater 110 is similar to the radiant heater 10 shown in FIGS. 2A-2C and 3A-3C, therefore, like elements will be identified by the same reference numerals. The radiant heater 110 includes the elongated, generally-rectangular shaped body 14 made of a ceramic material, a heating element 114 extending the length of the body 14 between the first and second ends 14A, 14B, element holders 118 for holding and supporting the heating elements 114 in position within the body 14, a reflector 122 positioned between the heating elements 114 and the body 14, and the mounting heads 30 for coupling the heater 110 to a housing (not shown).

Figure 12:
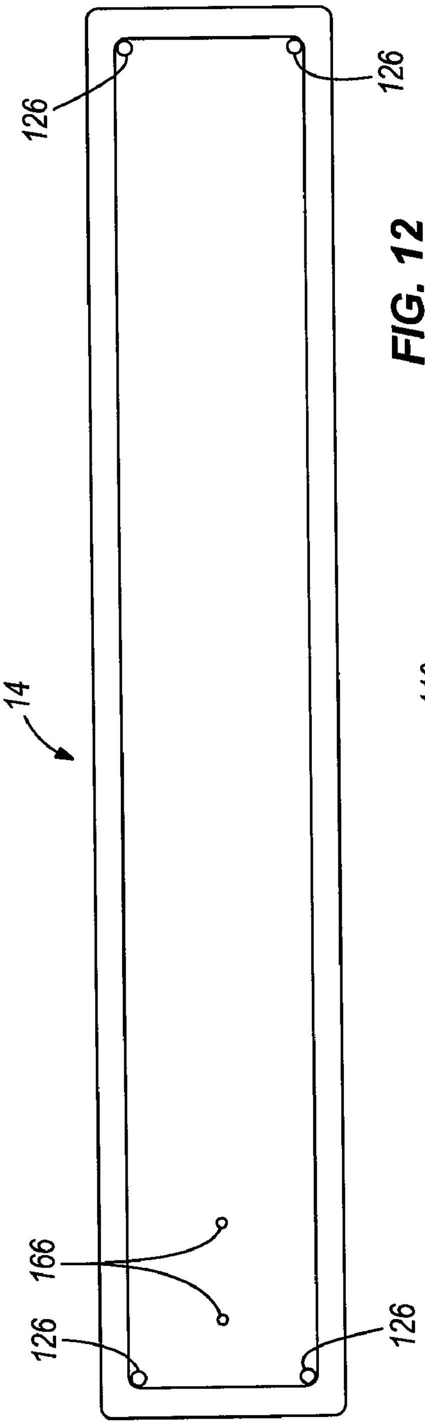
FIG. 12 illustrates another embodiment of a housing of the radiant heater shown in FIGS. 2A-2B, 3A-3C, 10A-10B and 18A-18B.
Figure 13:
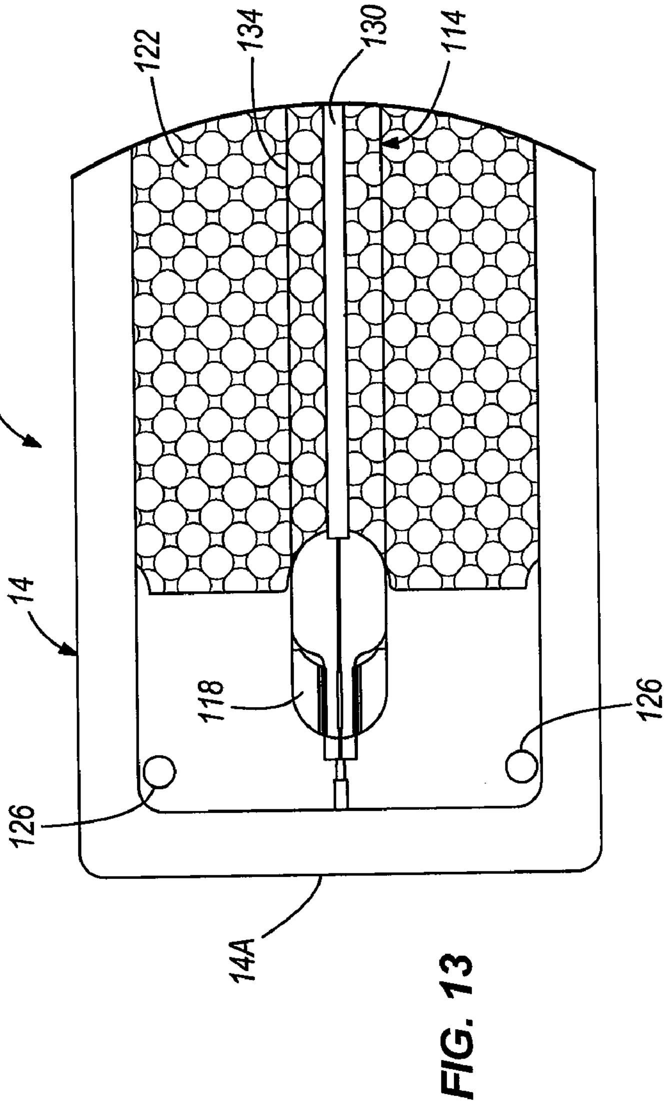
FIG. 13 illustrates an end portion of the radiant heater shown in FIG. 10A, including convection holes.
Figure 14A:
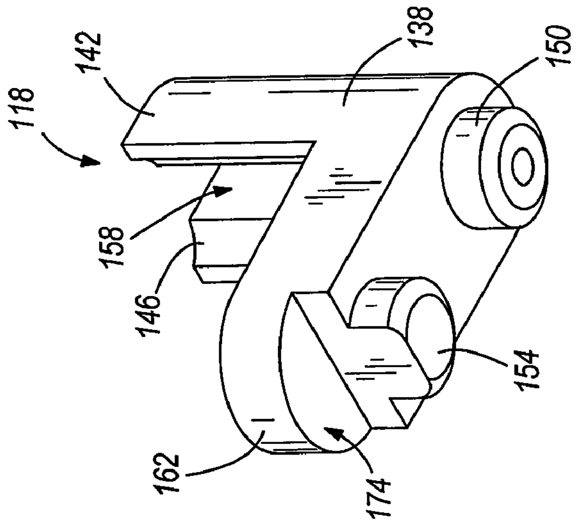
FIGS. 14A-14C illustrate an element holder according to one embodiment of the invention.
Figure 14B:
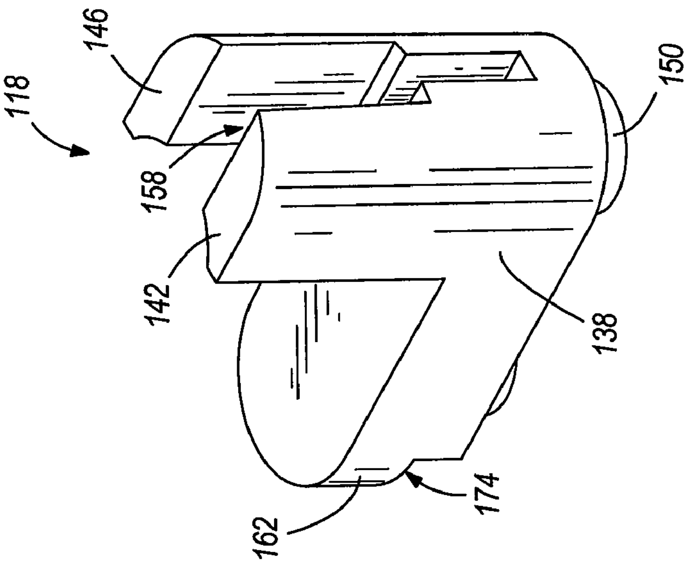
Figure 14C:
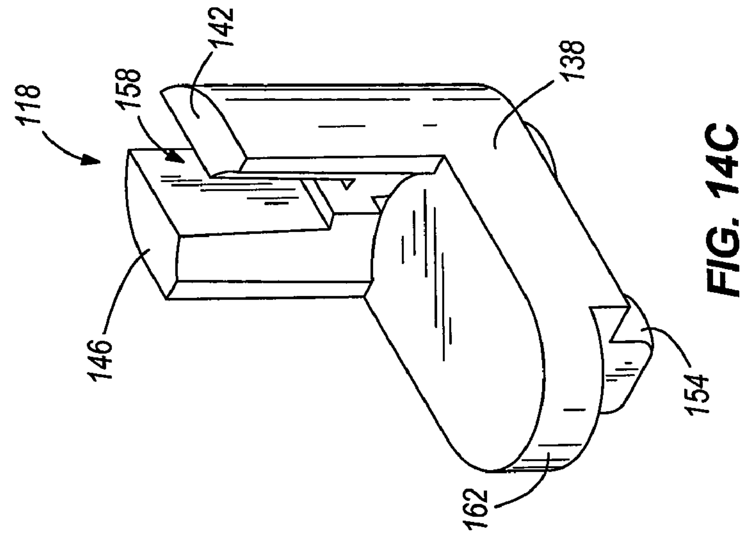

Referring to FIGS. 12 and 13, the heater 110 includes convection holes 126 formed in the base wall of the body 14. The convection holes 126 provide a through path for fumes generated by the process material during use of the radiant heater 110, for example when the heater 110 includes short-wave heating elements 114. The convection holes 126 minimize the accumulation of fumes in the cavity area of the heater by dispersing fumes through the holes 126. An accumulation of fumes may affect the physical characteristics of the process material. The convection holes 126 are located based upon the base wall of the body, the heating elements, and the process material location for sufficiently dispersing fumes.

In the illustrated embodiment, the heater body 14 is fabricated from an ultra-low expansion ceramic material that prevents cracks from forming in the body 14 when high temperature heating elements 114 are used. One example of the ceramic material is discussed above with respect to the radiant heater 10 shown in FIGS. 2A and 3A.

The radiant heater 110 includes one heating element 114 extending the length of the body 14 between the first and second ends 14A, 14B. The heating element 114 includes a halogen-tungsten element 130 housed within a quartz tube 134. The halogen-tungsten lamp 114 is also referred to as a halogen lamp. The halogen-tungsten element 130 provides short-wave infrared heating and has a watt density of about 190 W/in$^2$ (29 W/cm$^2$). The halogen-tungsten element 130 has an energization, or heat-up, time of about two seconds. In one embodiment, the halogen-tungsten element is formed with clear or transparent high purity quartz material. In another embodiment, the halogen-tungsten element 130 is housed within a ruby quartz tube, which absorbs the visible light emanating from the element 130 while transmitting most of the infrared energy.

Element holders 118 hold and maintain the heating element 114 within the inner cavity 54 of the body 14. One element holder 118 supports each end of the heating element 114 adjacent opposite ends 14A, 14B of the heater body 14. The element holders 118 are also fabricated from a hard, insulating ceramic material, which has low thermal expansion. In the illustrated embodiment, the ceramic material is steatite. It should be readily apparent to those of skill in the art that zero expansion ceramic material having other chemical formulations may be used to fabricate the element holders 118.

Referring to FIGS. 14A-14C and 15, the element holder 118 includes a body portion 138 having a pair of upwardly extending flanges 142, 146 and a pair of downwardly extending projections 150, 154. The flanges 142, 146 define a channel 158 for receiving one end of the heating element 114. In one embodiment, the heating element 114 is maintained within the channel 158 by a friction fit or pressure fit, although other mechanisms for securing the heating element 114 within the channel 158 may be used. In a further embodiment, the heating element 114 is placed within the channel 158, and the wire element extends from the heating element and is coupled to the mounting head 30 to hold the heating element 114 in place. The body portion 138 includes an outwardly extending shoulder 162 that may be used to retain the reflector 122 within the body 14.

To couple each element holder 118 to the body 14 of the heater 110, the first projection 150 is retained in an aperture 166 (FIG. 12) formed in the base wall 34 of the body 14. In one embodiment, the projection 150 may be secured to the body 14 by a friction or pressure fit, or a high temperature cement. It should be readily apparent to those of skill in the art that a second aperture may be formed in the base wall 34 for retaining the second projection 154. To further secure the element holder 118 to the body 14, a high temperature cement, or glue, that is capable of withstanding high temperatures bonds the element holder 118 to the body 14. High temperature cement is necessary to prevent the element holders 118 from separating from the body 14 at high operating temperatures of the heating elements 114. One example of the cement is discussed above with respect to the support plates 22 for the radiant heater 10 shown in FIGS. 2A and 3A.

In another embodiment an additional mechanical means may be used to couple the element holder to the heater body. For example, the element holder 118 includes the pair of downwardly extending projections 150, 154, and the first projection 150 includes a slot therethrough for receiving a mechanical fastener (not shown). Further, at least the first projection 150 has a greater length to facilitate attachment. To couple the element holder 118 to the body 14 of the heater 110, the first projection 150 is retained in the aperture 166 formed in the base wall 34 of the body 14 and a wire fastener clip (not shown) slides through the slot of the first projection 150 to keep the element holder 118 from falling out of the heater body 14. In one embodiment, the projection 150 may be secured to the body 14 by a friction or pressure fit. As discussed above with respect to FIGS. 14A-14C, to further secure the element holder 118 to the body 14, a high temperature cement, or glue, that is capable of withstanding high temperatures bonds the element holder 118 to the body 14.

Figure 16A:
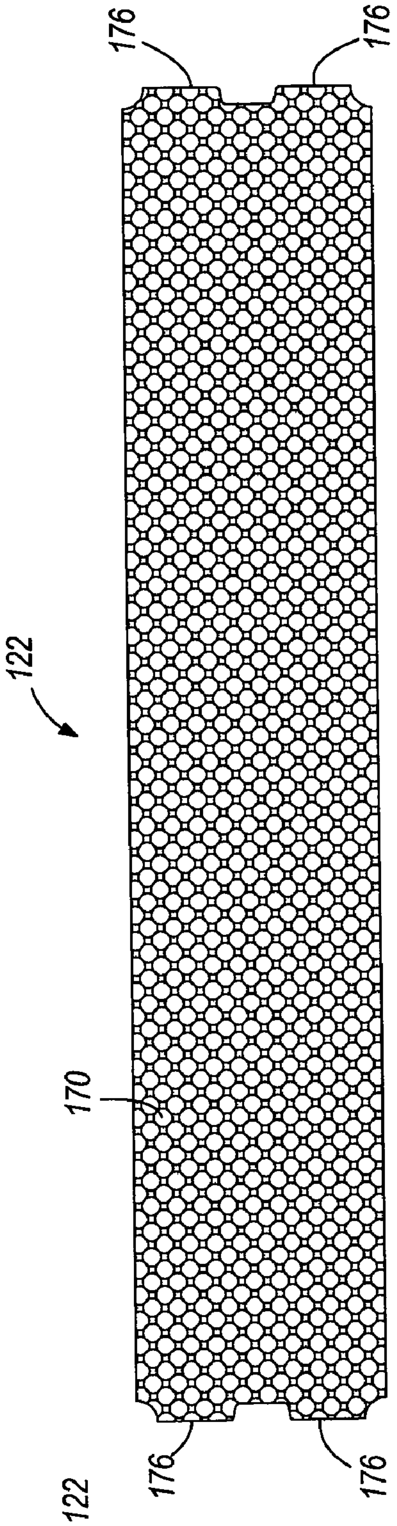
FIGS. 16A-16B illustrate one embodiment of a parabolic reflector for use with a radiant heater.
Figure 16B:
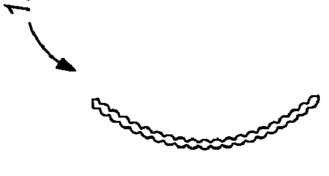

The reflector 122 is positioned in the heater 110 between the heating elements 114 and the base wall 34 of the body 14. FIGS. 16A and 16B illustrate one embodiment of the reflector 122 used in the radiant heater 110, which in the illustrated embodiment has a generally parabolic shape. With respect to the parabolic reflector 122, the parabola has the equation, $y^2=4px$, where a focal point of the parabola is at (0,p). The distance p becomes critical when a reflective surface 170 is gold coated. The equation for the parabola should consider the average thickness of the reflector 122. To form the parabolic reflector 122, the reflector 122 is fabricated as discussed above with respect to FIGS. 7A and 7B; however, the alumina tape is fired on a parabolic mold to achieve the parabolic shape. The reflector mold is designed based upon the desired parabolic shape, focal point for the application, and desired distance between the reflector 122 and the heating element 114.

Figure 15:
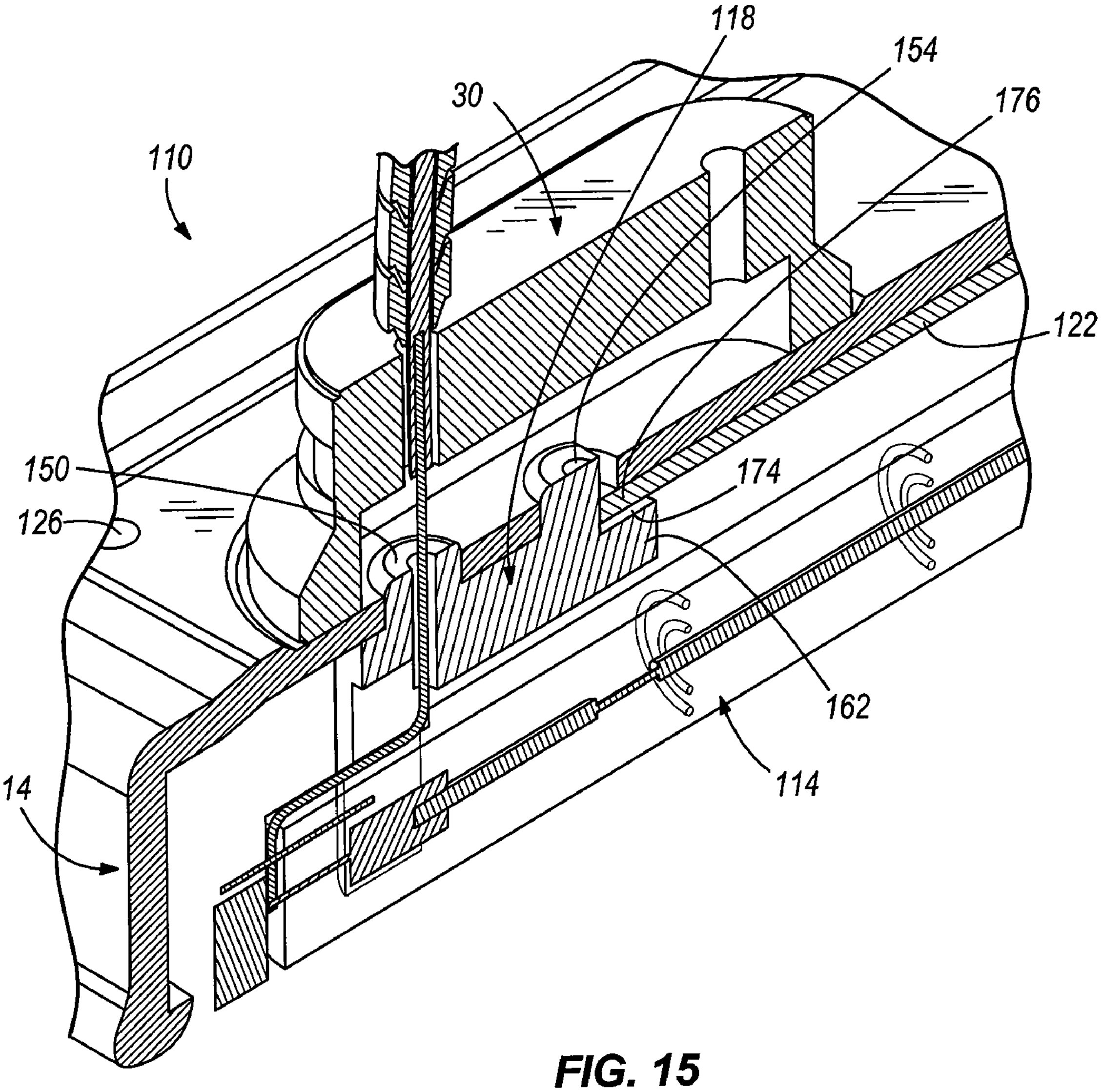
FIG. 15 is a schematic illustration of a cross-section of the radiant heater shown in FIG. 10A, including the element holder.

The reflector 122 has an elongated, generally parabolic-shaped body that is sized to fit within the inner cavity 54 of the heater body 14. In the illustrated embodiment, the reflector 122 is held in place by the element holders 118, which allows the reflector 122 to float and expand within the body 14. Referring to FIGS. 10A and 15, the reflector 122 may slide longitudinally and laterally within the inner cavity 54; however, the ends of the reflector 122 slide within a channel 174 (FIG. 15) defined by the shoulder 162 of the element holder 118 and the body 14. In the illustrated embodiment, each end of the reflector 122 includes a pair of projections 176. When the radiant heater 10 is assembled, the projections 176 of the reflector 122 are received by the channel 174 defined by the element holder 118 to hold the reflector 122 in the heater body 14. Further, the elements holders 118 allow spacing between the reflector 122 and the base wall 34 of the body 14, which provides an air gap insulator through the heater 110.

At least the reflective surface 170 of the reflector 122 includes a dome-like pattern or other recessed patterns or bumps to provide a more specular reflection of the radiant energy. In one embodiment, the bumps provide a greater reflection rate for the reflector 122. In one embodiment, the reflector 122 includes a gold reflective surface. In further embodiments, the reflector 122 includes a white gold reflective surface. In still another embodiment, the radiant heater 110 includes a reflector 122 having a white reflective surface, which is formed by the reflector glaze (as discussed above).

In a further embodiment, a pair of projections are bonded to the reflective surface 170 of the reflector 122 to allow the reflector 122 to move laterally within the body 14 and keep the parabolic reflector 122 centered within the body 14. The projections may be fabricated from a hard, insulating ceramic material, which has low thermal expansion. In the illustrated embodiment, the ceramic material is steatite. To secure the projections to the reflective surface 170 of the reflector 122 a high temperature cement, or glue, that is capable of withstanding high temperatures bonds the projections to the reflector 122. A high temperature cement is necessary to prevent the projections from separating from the body 14 at high operating temperatures of the heating elements 114. One example of the cement is discussed above with respect to the support plates 22 for the radiant heater 10 shown in FIGS. 2A and 3A.

Figure 11A:
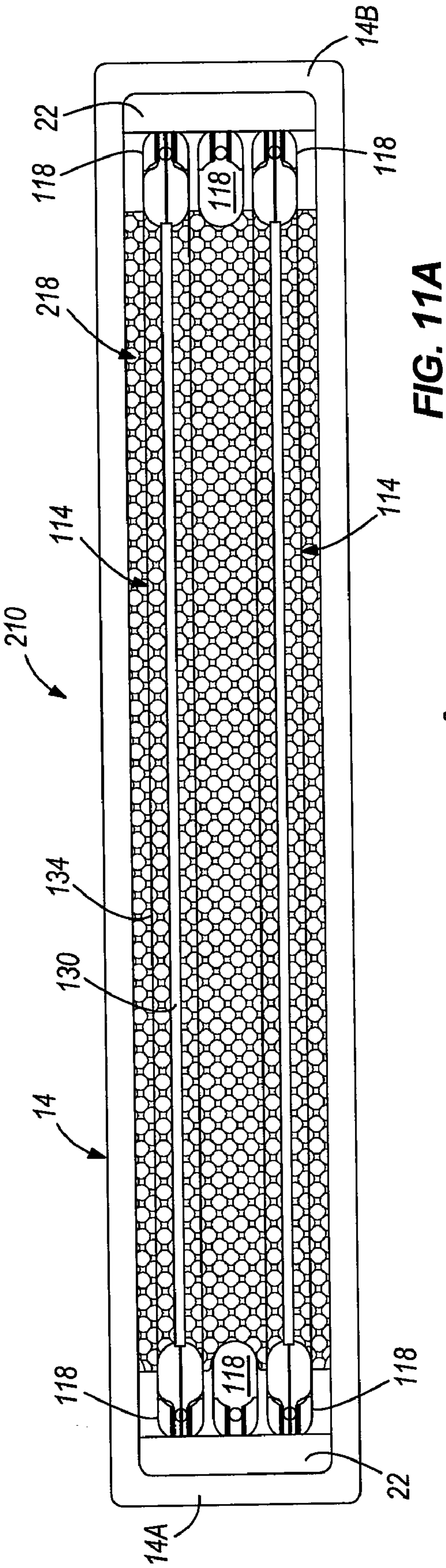
FIGS. 11A and 11B illustrate an embodiment of a radiant heater including a pair of halogen-tungsten lamps.
Figure 11B:
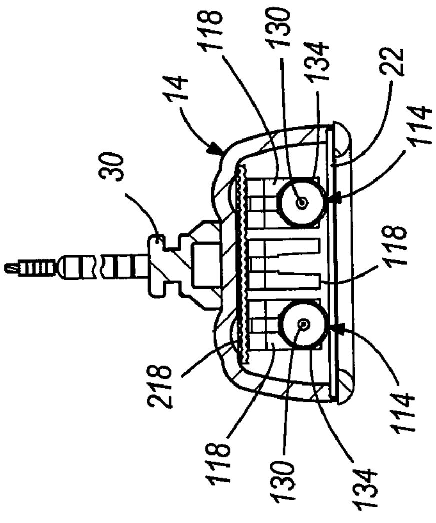

FIGS. 11A and 11B illustrate a radiant heater 210 according to another embodiment of the invention. The radiant heater 210 is similar to the radiant heater 110 shown in FIGS. 10A-10B, therefore, like elements will be identified by the same reference numerals. The radiant heater 210 includes a pair of heating elements 114 extending the length of the body 14 between the first and second ends 14A, 14B, each heating element 114 supported by a pair of element holders 118. Each heating element 114 includes a halogen-tungsten element 130 housed within a quartz tube 134. In the illustrated embodiment, the halogen-tungsten heating elements 114 are spaced apart. The use of two halogen-tungsten elements 114 allows customization of the wavelength and resultant radiant energy of the heater 210. In another embodiment, the halogen-tungsten elements 114 are housed within ruby quartz tubes, which diminish the light emitted from the heating element 114.

Figure 17:
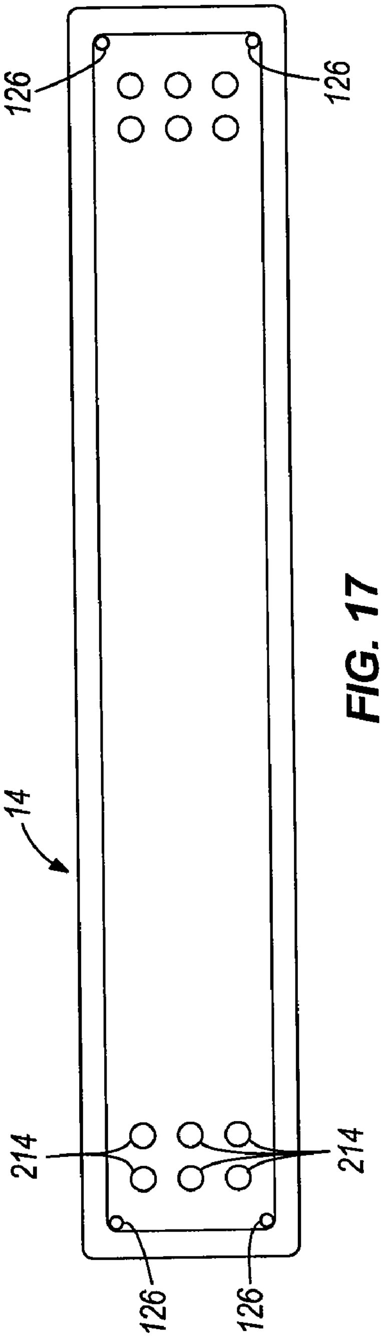
FIG. 17 illustrates one embodiment of a housing of the radiant heater shown in FIGS. 11A-11B, 19A-19B and 21A-21B.

Referring to FIG. 17, the heater 210 includes two pairs of apertures 214 at each end of body 14 for receiving the respective element holders 118. The body 14 also convection holes 126 formed in the base wall 34 of the body 14 for dispersing fumes, as discussed above.

The radiant heater 210 shown in FIGS. 11A and 11B includes a flat reflector 218 for re-directing heat from the heating elements 114 out of the body 14 and to a process material (not shown), as described above with respect to FIGS. 7A-7B. In the illustrated embodiment, the flat reflector 218 is used rather than the parabolic reflector 122 due to the number of heating elements 114 in the body 14.

In one embodiment, the reflector 218 includes a gold reflective surface. In further embodiments, the reflector 218 includes a white gold reflective surface, and in still another embodiment, the radiant heater 210 includes a reflector 218 having a white reflective surface, which is formed by the reflector glaze (as discussed above).

Figure 18A:
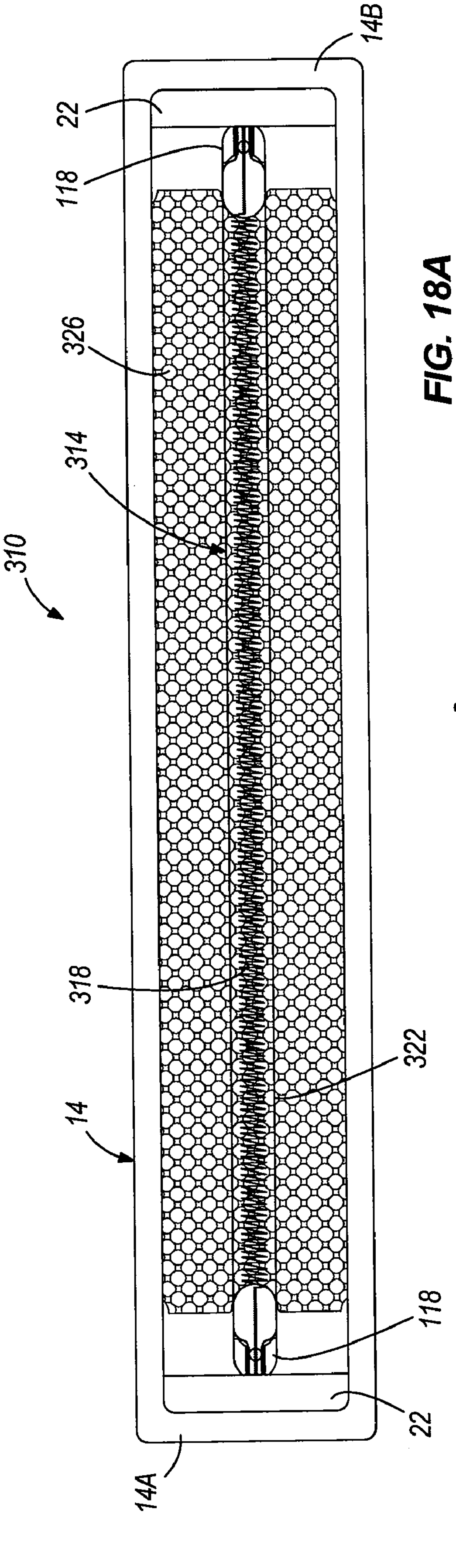
FIGS. 18A and 18B illustrate an embodiment of a radiant heater including a carbon element.
Figure 18B:
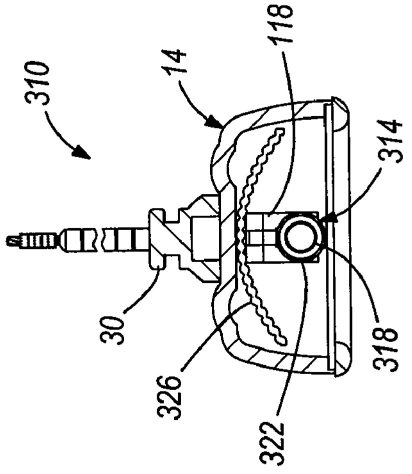

FIGS. 18A and 18B illustrate a radiant heater 310 according to another embodiment of the invention. The radiant heater 310 is similar to the radiant heater 110 shown in FIGS. 10A and 10B, therefore, like elements will be identified by the same reference numerals. The radiant heater 310 includes a heating element 314 extending the length of the body 14 between the first and second ends 14A, 14B. The heating element 314 includes a carbon element 318 housed within a quartz tube 322. The carbon element 318 provides medium-wave infrared heating and has a watt density of about 75 $W/in^2$ (12 $W/cm^2$). The carbon element 318 has an energization, or heat-up, time of about two seconds.

The heating element 314 is supported by a pair of element holders 118, as described above. Referring to FIG. 12, the heater 310 includes an aperture 166 at each end of body 14 for receiving the respective element holder 118. The body 14 also includes convection holes 126 formed in the base wall 34 of the body 14 for dispersing fumes, as described above.

The radiant heater 310 shown in FIGS. 18A and 18B includes a parabolic reflector 326 for re-directing heat from the heating elements 314 out of the body 14 and to a process material (not shown), as described above. The reflector 326 may include a gold reflective surface, a white gold reflective surface or a white reflective surface, which is formed by the reflector glaze, as described above.

Figure 19A:
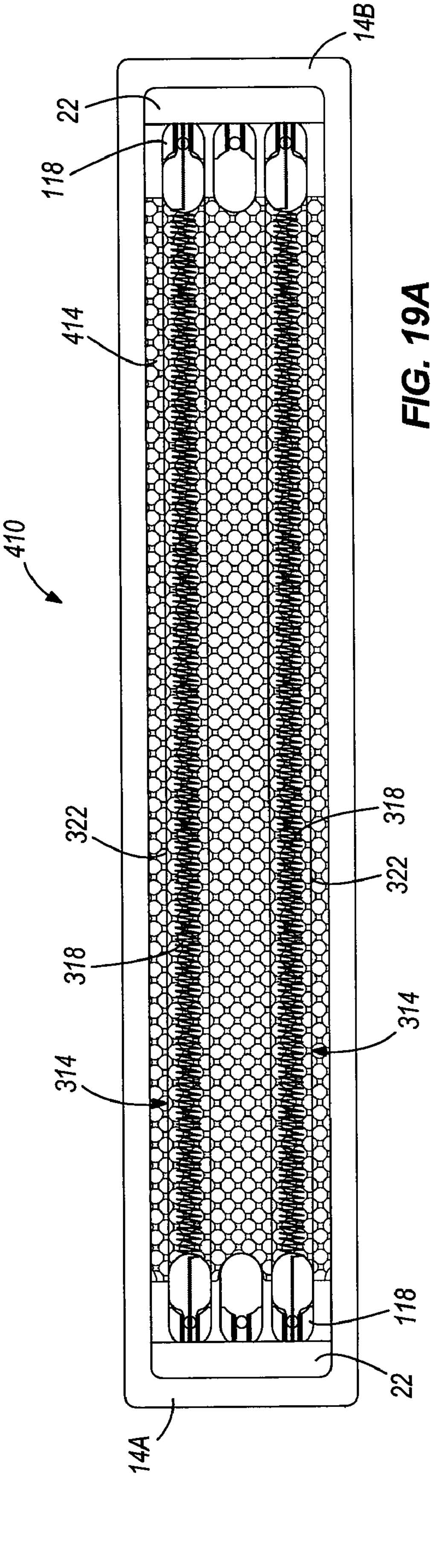
FIGS. 19A and 19B illustrate an embodiment of a radiant heater including two carbon elements.
Figure 19B:
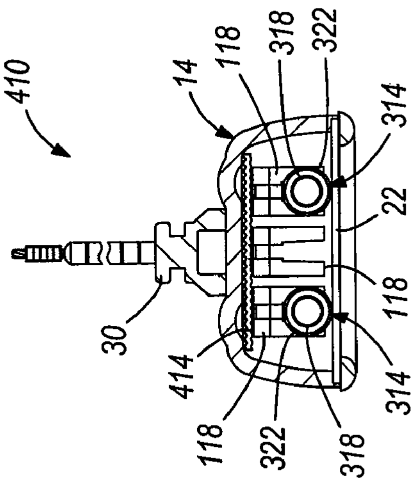

FIGS. 19A and 19B illustrate a radiant heater 410 according to another embodiment of the invention. The radiant heater 410 is similar to the radiant heater 310 shown in FIGS. 18A and 18B, therefore, like elements will be identified by the same reference numerals. The radiant heater 410 includes a pair of heating elements 314 extending the length of the body 14 between the first and second ends 14A, 14B. Each heating element 314 is supported by a pair of element holders 118. Each heating element 314 includes a carbon element 318 housed within the quartz tube 322. In the illustrated embodiment, the carbon heating elements 314 are spaced apart. The use of two carbon elements 318 allows customization of the wavelength and resultant radiant energy of the heater 410.

Referring to FIG. 17, the heater 410 includes two pairs of apertures 214 at each end of body 14 for receiving the respective element holders 118. The body 14 also includes convection holes 126 formed in the base wall 34 of the body 14 for dispersing fumes, as described above.

The radiant heater 410 shown in FIGS. 19A and 19B include a flat reflector 414 for re-directing heat from the heating lamps 314 out of the body 14 and to a process material (not shown), as described above. In the illustrated embodiment, the flat reflector 414 is used rather than the parabolic reflector due to the number of heating elements 314 in the body 14. The reflector 414 may include a gold reflective surface, a white gold reflective surface, or a white reflective surface, which is formed by the reflector glaze, as described above.

Figure 20A:
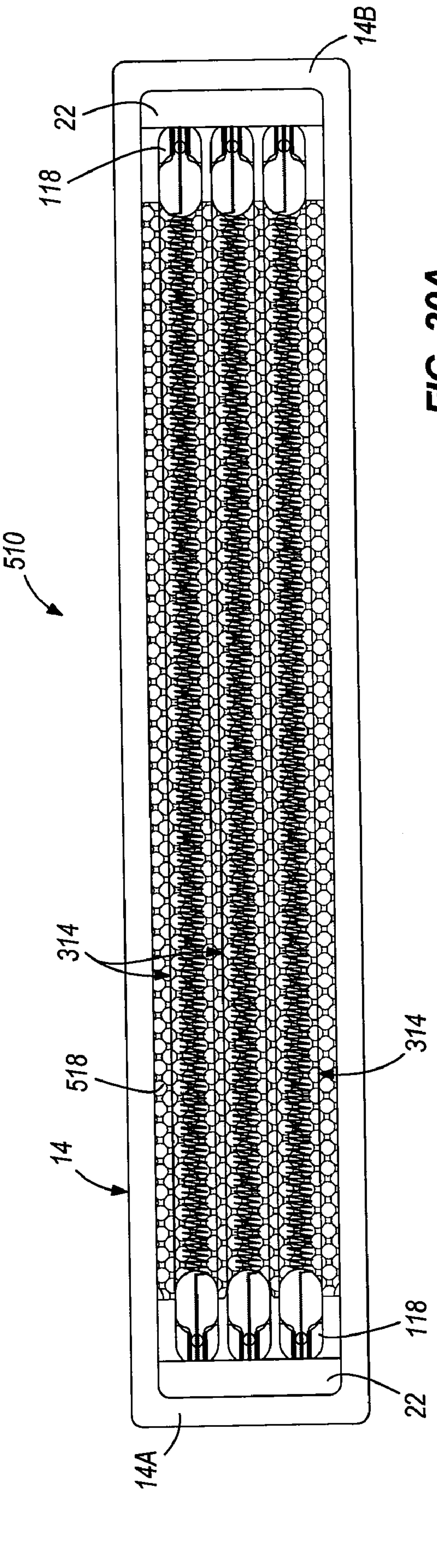
FIGS. 20A and 20B illustrate an embodiment of a radiant heater including three carbon elements.
Figure 20B:
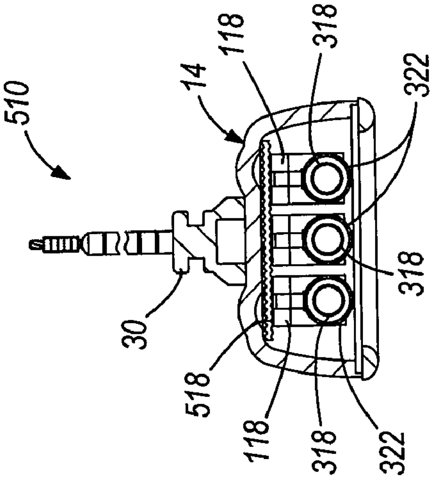

FIGS. 20A and 20B illustrate a radiant heater 510 according to another embodiment of the invention. The radiant heater 510 is similar to the radiant heater 310 shown in FIGS. 18A and 18B, therefore, like elements will be identified by the same reference numerals. The radiant heater 510 includes three heating elements 314 extending the length of the body 14 between the first and second ends 14A, 14B. Each heating element 314 includes a carbon element 318 housed within the quartz tube 322. In the illustrated embodiment, the carbon heating elements 318 are spaced apart. The use of three carbon elements 318 allows customization of the wavelength and resultant radiant energy of the heater 510.

Each heating element 314 is supported by a pair of element holders 118 and two supports plates 22 help maintain the heating elements 314 in the body 14. Referring to FIG. 17, the heater 510 includes three pairs of apertures 214 at each end of body 14 for receiving the respective element holders 118. The body 14 also includes convection holes 126 formed in the base wall 34 of the body 14 for dispersing fumes, as described above. One support plate 22 is positioned at each end of the body and is coupled to the body such that a portion of the support plate 22 overlaps ends of the heating elements 314.

The radiant heater 510 shown in FIGS. 20A and 20B includes a flat reflector 518 for re-directing heat from the heating elements 314 out of the body 14 and to a process material (not shown), as described above. In the illustrated embodiment, the flat reflector 518 is used rather than the parabolic reflector due to the number of heating elements 314 in the body 14. The reflector 518 may include a gold reflective surface, a white gold reflective surface, or a white reflective surface, which is formed by the reflector glaze, as described above.

The present invention radiant heater allows heating elements having different wavelengths to be used in a single unit. For example, in one embodiment a single heater may include two heating elements, one delivering short-waves and one delivering medium-waves. Therefore, a radiant heater may deliver short, medium or long waves as a single unit by utilizing different heating elements. The use of multiple elements having different wavelengths allows customization of the wavelength and resultant radiant energy of the heater.

Figure 21A:
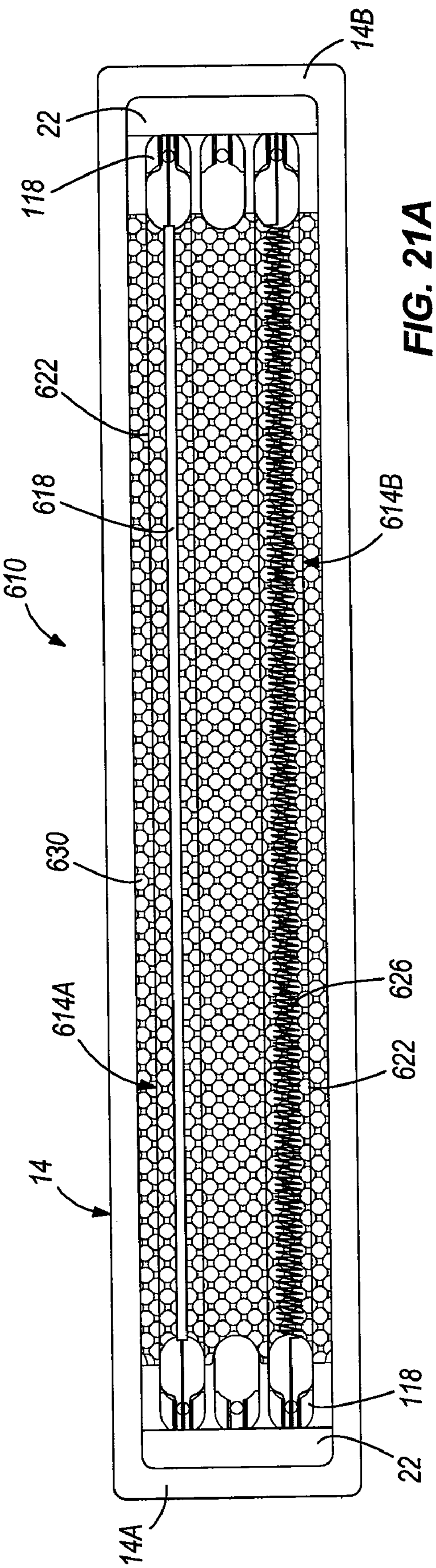
FIGS. 21A and 21B illustrate an embodiment of a radiant heater including a halogen-tungsten element and a carbon element.
Figure 21B:
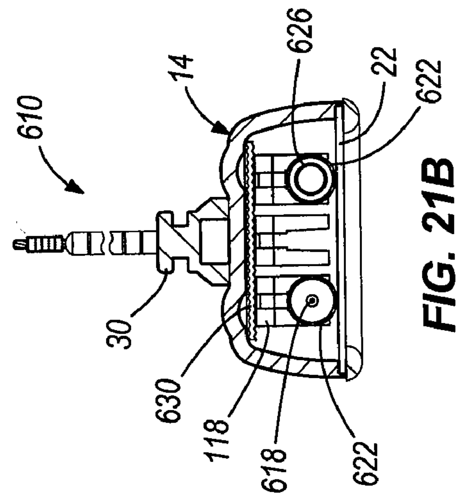

FIGS. 21A and 21B illustrate a radiant heater 610 according to another embodiment of the invention. The radiant heater 610 is similar to the radiant heaters 210 and 410 shown in FIGS. 11A-11B and 19A-19B, therefore, like elements will be identified by the same reference numerals. The radiant heater 610 includes a pair of heating elements 614A, 614B extending the length of the body 14 between the first and second ends 14A, 14B, each heating element is supported by a pair of element holders 118. One heating element 614A includes a halogen-tungsten element 618 housed within a quartz tube 622 and the other heating element 614B includes a carbon element 626 housed within a quartz tube 622. In the illustrated embodiment, the heating elements 614A, 614B are spaced apart. In another embodiment, the halogen-tungsten element 618 is housed within a ruby quartz tube, which diminishes the light emitted from the heating element 614A.

Referring to FIG. 17, the heater 610 includes two pairs of apertures 214 at each end of body 14 for receiving the respective element holders 118. The body 14 also includes convection holes 126 formed in the base wall 34 of the body 14 for dispersing fumes, as described above.

The radiant heater 610 shown in FIGS. 21A and 21B include a flat reflector 630 for re-directing heat from the heating elements 614A, 614B out of the body 14 and to a process material (not shown), as described above. In the illustrated embodiment, the flat reflector 630 is used rather than the parabolic reflector due to the number of heating elements in the body 14. The reflector 630 may include a gold reflective surface, a white gold reflective surface, or a white reflective surface, which is formed by the reflector glaze (as discussed above).

Figure 22A:
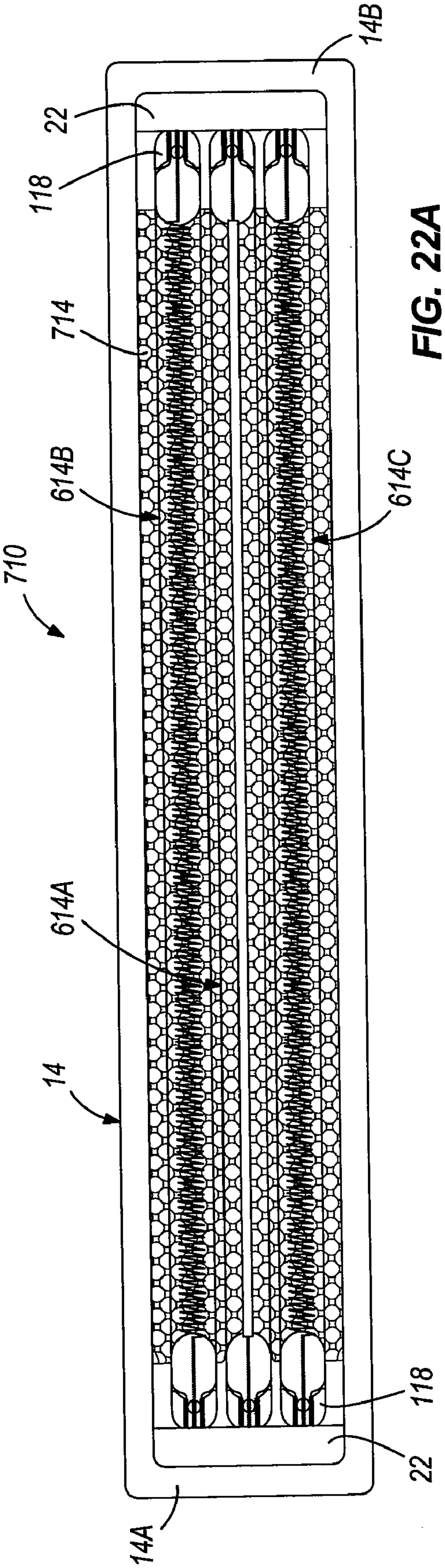
FIGS. 22A and 22B illustrate an embodiment of a radiant heater including a halogen-tungsten element and carbon elements.
Figure 22B:
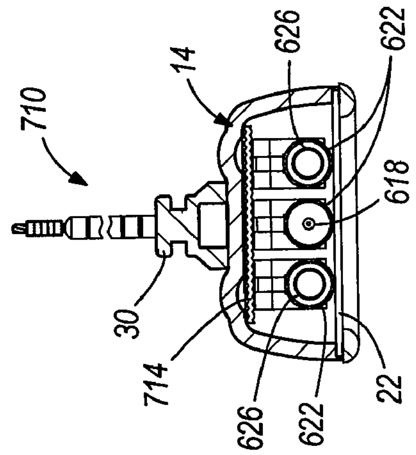

FIGS. 22A and 22B illustrate a radiant heater 710 according to another embodiment of the invention. The radiant heater 710 is similar to the radiant heaters 310 and 610 shown in FIGS. 20A-20B and 21A-21B, therefore, like elements will be identified by the same reference numerals. The radiant heater 710 includes three heating elements 614A, 614B, 614C extending the length of the body 14 between the first and second ends 14A, 14B. The center heating element 614A includes a halogen-tungsten element 618 housed within the quartz tube 622 and the outer heating elements 614B, 614C include a carbon element 626 housed within a quartz tube 622. In another embodiment, the halogen-tungsten element 618 is housed within a ruby quartz tube, which diminishes the light emitted from the heating element 614A.

Each heating element 614A-614C is supported by a pair of element holders 118 and two supports plates 22 help maintain the heating elements in the body 14. Referring to FIG. 17, the heater 710 includes three pairs of apertures 214 at each end of body 14 for receiving the respective element holders 118. The body 14 also includes convection holes 126 formed in the base wall 34 of the body 14 for dispersing fumes, as described above. One support plate 22 is positioned at each end of the body 14 and is coupled to the body 14 such that a portion of the support plate 22 overlaps ends of the heating elements 614A-614C.

The radiant heater 710 shown in FIGS. 22A and 22B includes a flat reflector 714 for re-directing heat from the heating elements 614A-614C out of the body 14 and to a process material (not shown), as described above. In the illustrated embodiment, the flat reflector 714 is used rather than the parabolic reflector due to the number of heating elements in the body 14. The reflector 714 may include a gold reflective surface, a white gold reflective surface, or a white reflective surface, which is formed by the reflector glaze (as discussed above).

It should be appreciated that in radiant heaters utilizing multiple heating elements, the elements may be energized separately to further customize the wavelength and resultant radiant energy of the heater. In one embodiment, energization and de-energization of the heating elements (individually or in combination) is initiated and controlled by a controller.

It should also be appreciated that the radiant heater components described above may be utilized to fabricate customized heaters. For example, a user may designate a desired wavelength, resultant radiant energy, body size, structural housing, or the like, and a radiant heater can be built to the desired specifications using the universally sized bodies, the element holders, the support plates, the mounting heads, the reflectors, and heating elements.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A radiant heater comprising:

a heater body having a box-like configuration, the body defining an inner cavity and including a base wall and an open end opposite the base wall, wherein the body is fabricated from an ultra-low thermal expansion ceramic material at least partially containing Petalite;

a heating element extending a length of the body and positioned to direct energy through the open end of the body;

at least one mounting head coupled to the body and formed from a ceramic material.

2. The radiant heater of claim 1 wherein the base wall of the body includes at least one aperture for dispersing fumes that accumulate in the inner cavity.

3. The radiant heater of claim 1, and further comprising a reflector positioned between the base wall of the body and the heating element wherein the reflector re-directs energy from the heating element through the open end of the body.

4. The radiant heater of claim 1 wherein the heating element includes a wire element contained within a quartz tube.

5. The radiant heater of claim 4 wherein the quartz tube is translucent.

6. The radiant heater of claim 4 wherein the quartz tube is a ruby quartz tube.

7. The radiant heater of claim 4 wherein the wire element is selected from a group consisting of a resistance wire element, a halogen-tungsten element and a carbon element.

8. The radiant heater of claim 7 wherein the resistance wire element is formed from a ferritic alloy.

9. The radiant heater of claim 1 wherein the heating element selected from the group consisting of a short-wave heating element, a medium-wave heating element and a long-wave heating element.

10. The radiant heater of claim 1 wherein the heating element includes a plurality of heating elements extending the length of the body.

11. The radiant heater of claim 10 wherein each heating element includes a wire element contained within a quartz tube.

12. The radiant heater of claim 11 wherein the quartz tube is a twin bore tube, each bore containing one wire element.

13. The radiant heater of claim 10 wherein at least one of the heating elements is a short-wave heating element and at least one of the heating elements is a medium-wave heating element.

14. The radiant heater of claim 1, and further comprising a pair of support plates extending across a width of the body at opposite ends of the body wherein the support plates hold the heating element in position.

15. The radiant heater of claim 1, and further comprising a element holders positioned at opposite ends of the heater body and coupled to the base wall of the body, wherein each element holder couples one end of the heating element to the body.

16. The radiant heater of claim 3 wherein the reflector is substantially planar.

17. The radiant heater of claim 3 wherein the reflector has a substantially parabolic shape.

18. The radiant heater of claim 3 wherein the reflective surface of the reflector includes a dome-like pattern.

19. The radiant heater of claim 3 wherein the reflective surface of the reflector includes a white reflective coating.

20. The radiant heater of claim 3 wherein the reflective surface of the reflector includes a gold reflective coating.

21. An industrial heating system for use in drying or heating processes, the heating system comprising:

a housing for positioning adjacent a process path for a process material;

a radiant heater housed within the housing and directed towards the process path, the radiant heater comprising, a heater body having a box-like configuration, the body defining an inner cavity and including a base wall and an open end opposite the base wall, the open end directed towards the process path, wherein the heater body is formed from an ultra-low thermal expansion ceramic material at least partially containing Petalite, a heating element extending a length of the body and positioned to direct energy through the open end of the body, a reflector positioned between the base wall of the body and the heating element wherein a reflective surface of the reflector re-directs energy from the heating element through the open end of the body, and a mounting head coupled to the body and formed from a ceramic material.

22. The heating system of claim 21, and further comprising at least one aperture for dispersing fumes that accumulate in the inner cavity.

23. The heating system of claim 21 wherein a plurality of radiant heaters are within the housing and directed towards the process path.

24. The heating system of claim 23 wherein the heating element of at least two radiant heaters have different wavelengths.

* * * * *